United States Patent [19]
Clark et al.

[11] Patent Number: 5,765,001
[45] Date of Patent: *Jun. 9, 1998

[54] COMPUTER SYSTEM WHICH IS OPERATIVE TO CHANGE FROM A NORMAL OPERATING STATE TO A SUSPEND STATE WHEN A POWER SUPPLY THEREOF DETECTS THAT AN EXTERNAL SOURCE IS NO LONGER PROVIDING POWER TO SAID POWER SUPPLY AT A PREDETERMINED LEVEL

[75] Inventors: Michael William Clark, Hillsborough; James Alfred Heaney, Durham; Duane Edward Norris; Paul Harrison Benson, IV, both of Raleigh, all of N.C.

[73] Assignee: International Business Machines Corporation, Armonk, N.Y.

[*] Notice: The term of this patent shall not extend beyond the expiration date of Pat. No. 5,748,972.

[21] Appl. No.: 639,638

[22] Filed: Apr. 29, 1996

[51] Int. Cl.⁶ .................. G06F 1/30; G06F 1/32
[52] U.S. Cl. .................. 395/750.08; 395/750.01; 395/182.12; 364/492
[58] Field of Search ............ 395/750, 182.2, 395/182.12, 750.01, 750.08, 182.22; 364/707, 492; 307/66

[56] References Cited

U.S. PATENT DOCUMENTS

| | | | |
|---|---|---|---|
| 4,600,990 | 7/1986 | Gershenson et al. | 364/200 |
| 4,698,808 | 10/1987 | Ishii | 371/21 |
| 5,070,251 | 12/1991 | Rhodes et al. | 307/46 |
| 5,210,685 | 5/1993 | Rosa | 363/109 |
| 5,216,357 | 6/1993 | Coppola et al. | 324/142 |
| 5,295,258 | 3/1994 | Jewett et al. | 395/575 |
| 5,317,752 | 5/1994 | Jewett et al. | 395/750 |
| 5,327,553 | 7/1994 | Jewett et al. | 395/750 |
| 5,341,503 | 8/1994 | Gladstein et al. | 395/750 |
| 5,386,552 | 1/1995 | Garney | 395/575 |
| 5,396,637 | 3/1995 | Harwell et al. | 395/750 |
| 5,446,904 | 8/1995 | Belt et al. | 395/750 |
| 5,450,003 | 9/1995 | Cheon | 323/272 |
| 5,485,623 | 1/1996 | Kurokawa et al. | 395/182.2 |
| 5,603,038 | 2/1997 | Crump et al. | 395/750 |
| 5,630,142 | 5/1997 | Crump et al. | 395/750 |

FOREIGN PATENT DOCUMENTS

| | | | |
|---|---|---|---|
| 0256815 | 2/1988 | European Pat. Off. | G06F 11/00 |
| 0565914 | 10/1993 | European Pat. Off. | G06F 1/32 |
| 4337055 | 5/1994 | Germany | G06F 12/16 |
| 4340069 | 6/1995 | Germany | G06F 12/16 |

OTHER PUBLICATIONS

Abstract for DE 43 37 055 and DE 43 40 069.
IBM TDB: (Aug. 1993) pp.607–612.
Peter Green; Stringent Testing Ensures Immunity To Power-Line Disruptions; *Electrical Design News* 33 (Oct. 13, 1988) No. 21 pp.161–168.

Primary Examiner—Gopal C. Ray
Attorney, Agent, or Firm—Anthony N. Magistrale

[57] ABSTRACT

Described is a personal computer system which includes a central processing unit (CPU) and power management circuitry (PMC) in circuit communication with the CPU. A power supply is in circuit communication with the CPU and the PMC and includes circuitry for selectively providing system power to the computer system and auxiliary power to the PMC (1) from an external source or (2) from an internal source. When the system is in a normal operating state and the external source stops providing power at a predetermined level (e.g., brownout or blackout) to the power supply, the power supply is operative to generate a control signal to the PMC and switch to its internal power source. The power management circuitry is characterized in that while in the normal operating state, responsive to the power supply activating the control signal, the PMC causes the computer system to change to the suspend state wherein the entire state of the system is safely saved to a non-volatile storage device.

36 Claims, 25 Drawing Sheets

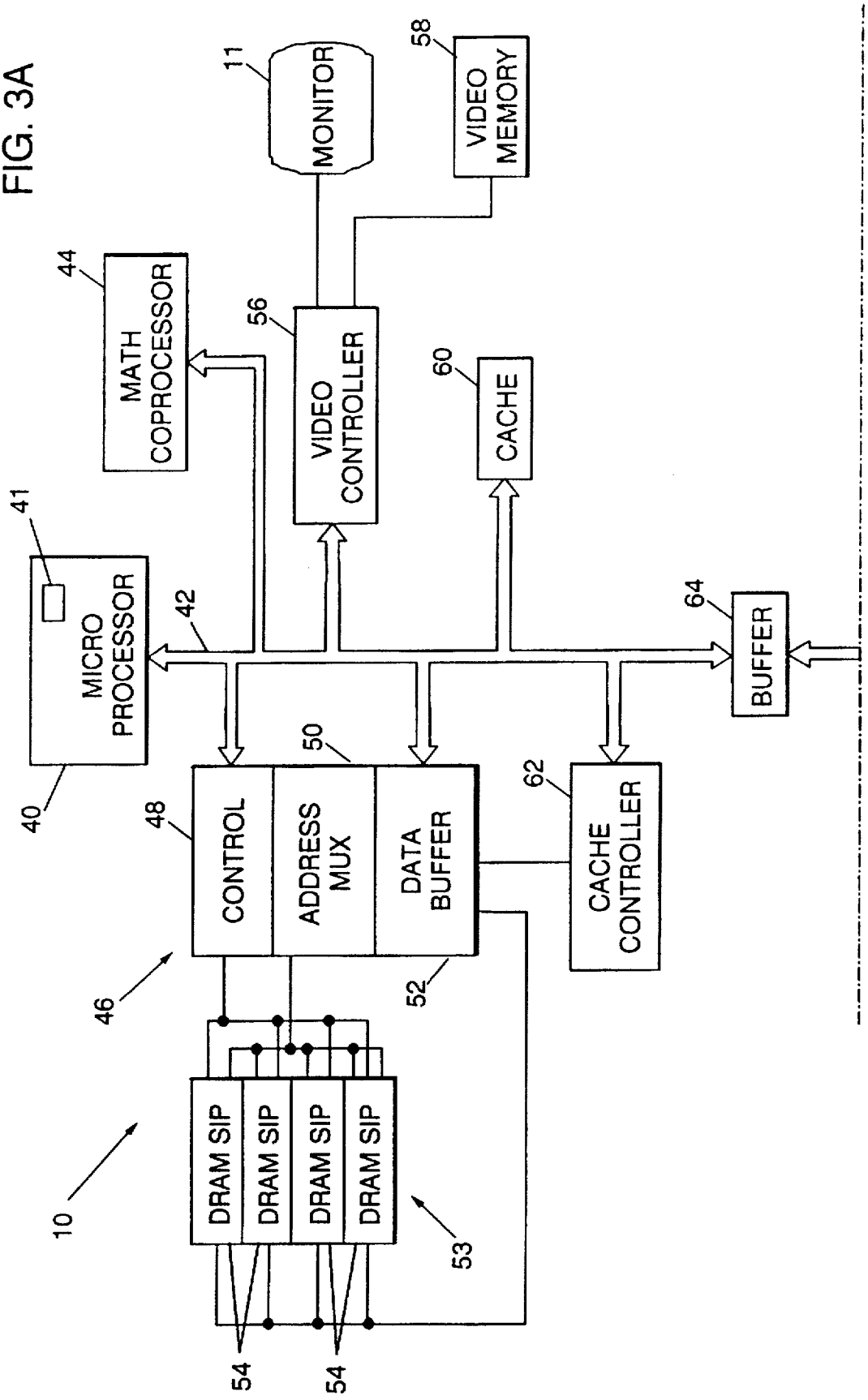

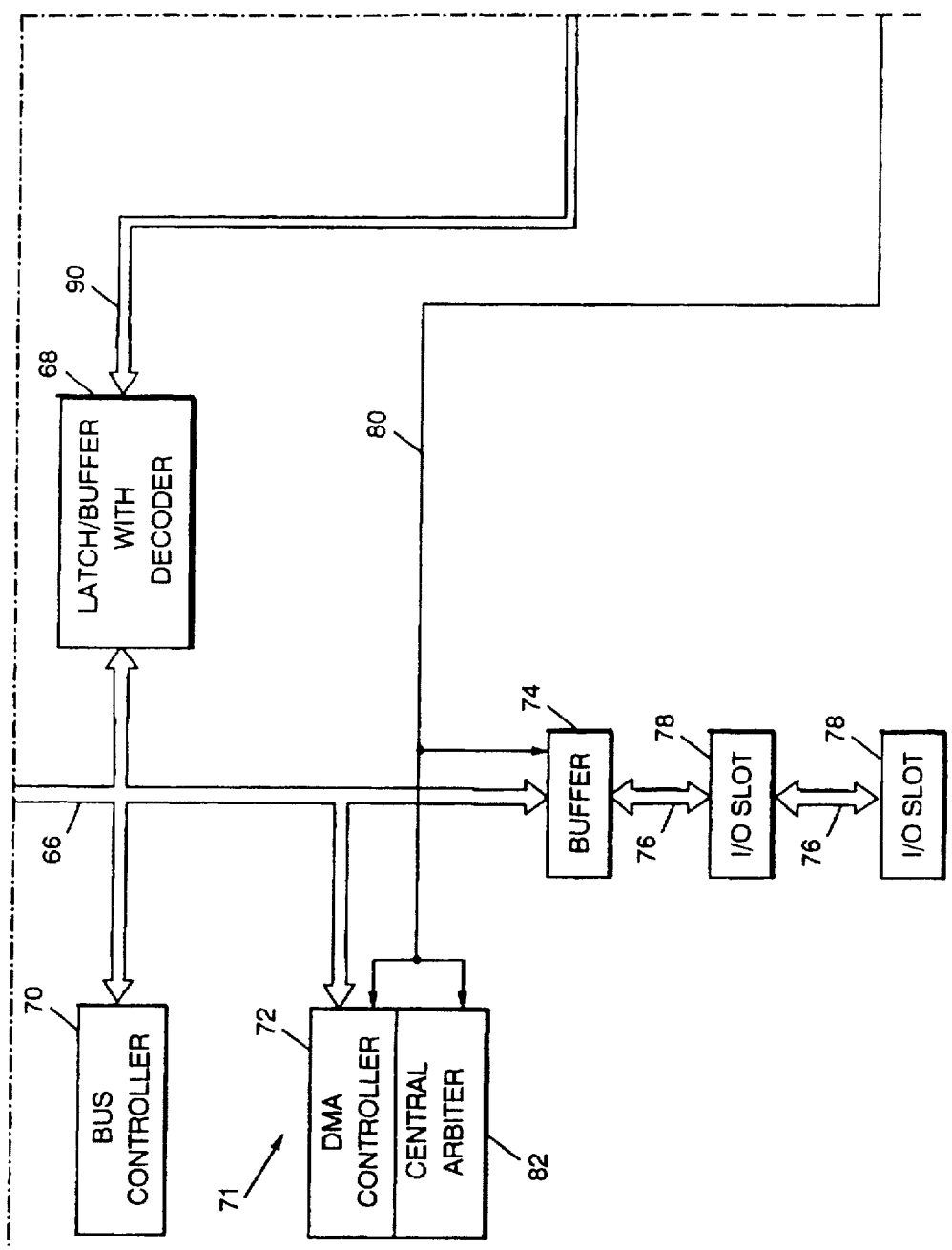

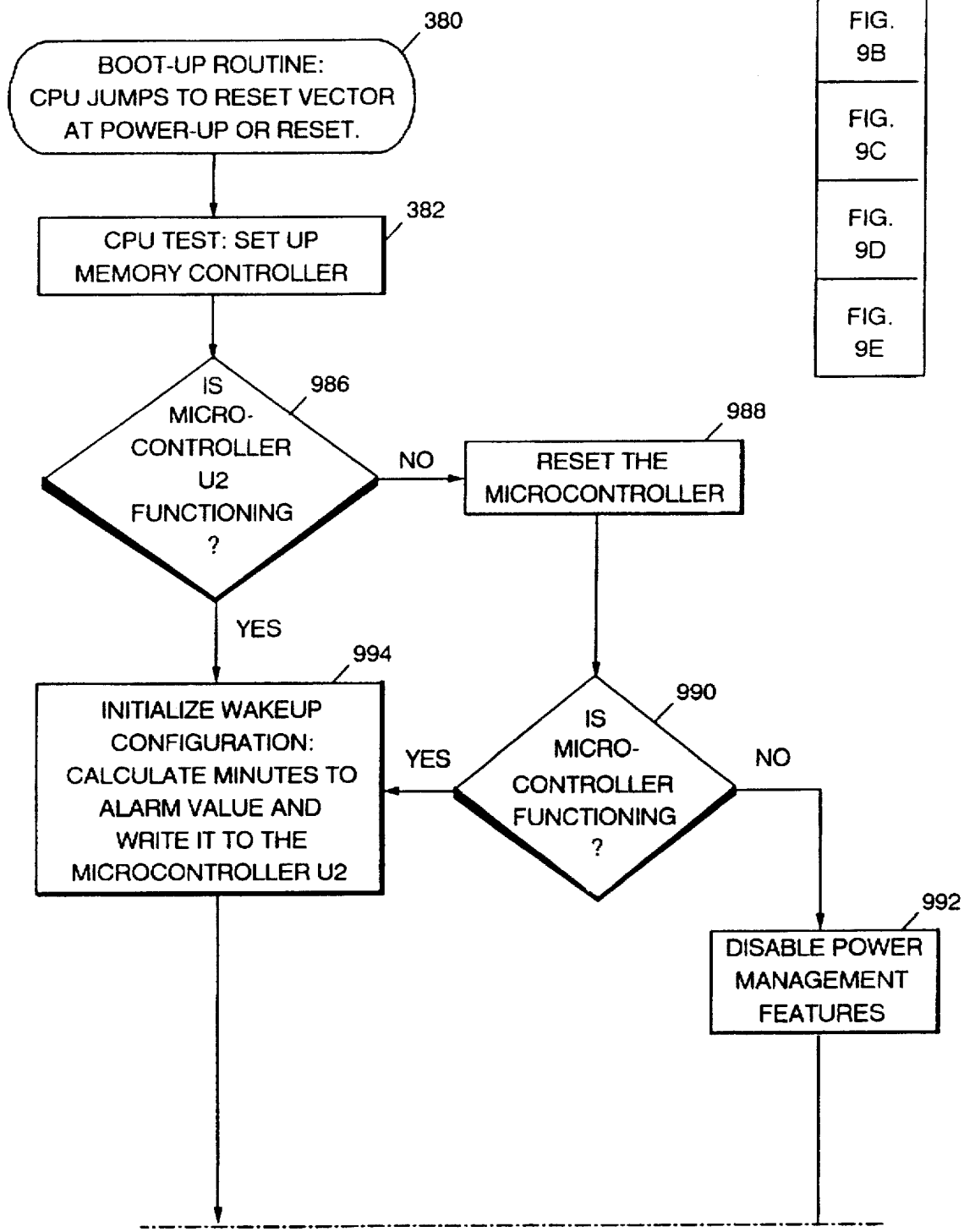

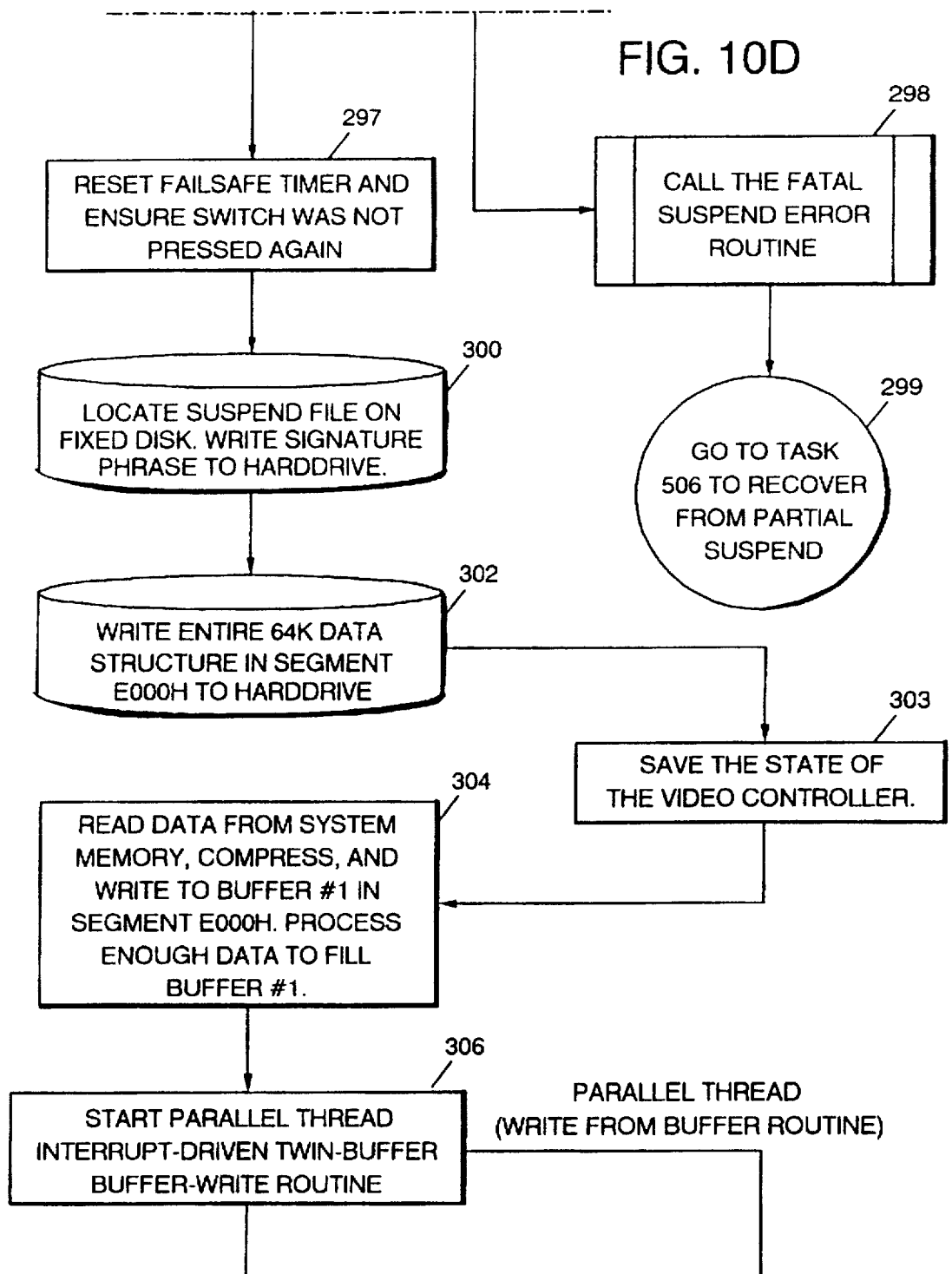

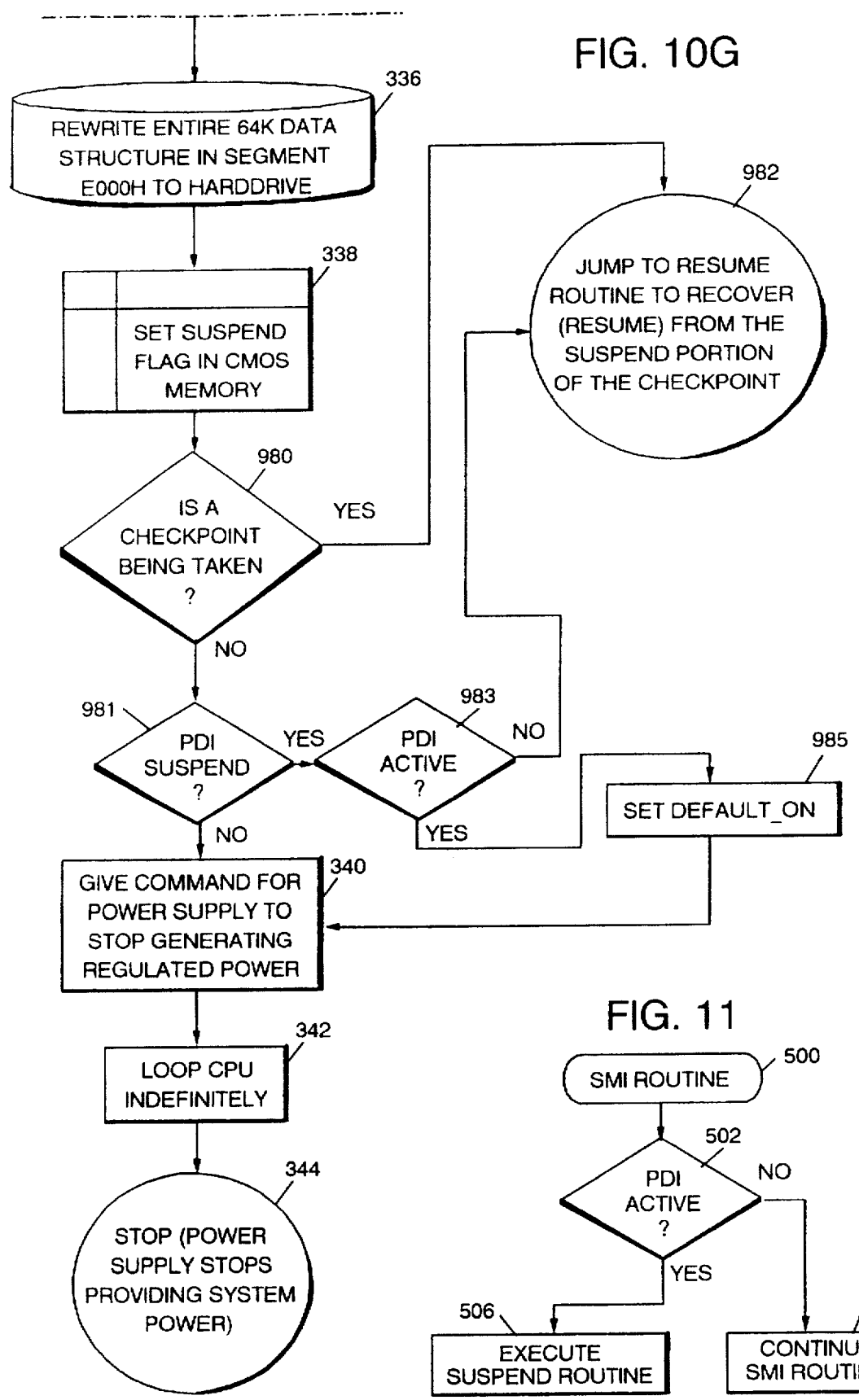

COMPUTER SYSTEM WHICH IS OPERATIVE TO CHANGE FROM A NORMAL OPERATING STATE TO A SUSPEND STATE WHEN A POWER SUPPLY THEREOF DETECTS THAT AN EXTERNAL SOURCE IS NO LONGER PROVIDING POWER TO SAID POWER SUPPLY AT A PREDETERMINED LEVEL

RELATED APPLICATIONS

The present invention is believed to be related to the following applications:

application Ser. No. 08/097,334, filed Jul. 23, 1993, now U.S. Pat. No. 5,1513,359, and entitled "DESKTOP COMPUTER HAVING A SINGLE SWITCH SUSPEND/RESUME FUNCTION" (further identified as Attorney Docket No. BC9-93-018);

application Ser. No. 08/097,250, filed Jul. 26, 1993, now U.S. Pat. No. 5,511,202, and entitled "DESKTOP COMPUTER SYSTEM HAVING ZERO VOLT SYSTEM SUSPEND" (further identified as Attorney Docket No. BC9-93-016);

application Ser. No. 08/097,246, filed Jul. 23, 1993, now U.S. Pat. No. 5,497,494, and entitled "METHOD OF SAVING AND RESTORING THE STATE OF A CPU EXECUTING CODE IN A PROTECTED MODE" (further identified as Attorney Docket No. BC9-93-017);

application Ser. No. 08/097,251, filed Jul. 26, 1993, now U.S. Pat. No. 5,548,763, and entitled "DESKTOP COMPUTER SYSTEM HAVING MULTI-LEVEL POWER MANAGEMENT" (further identified as Attorney Docket No. BC9-93-015);

application Ser. No. 08/302,147, filed Sep. 7, 1994, now U.S. Pat. No. 5,630,142, and entitled "MULTIFUNCTION POWER SWITCH AND FEEDBACK LED FOR SUSPEND SYSTEMS" (further identified as Attorney Docket No. BC9-94-108);

application Ser. No. 08/301,466, filed Sep. 7, 1994, now U.S. Pat. No. 5,530,879, and entitled "POWER MANAGEMENT PROCESSOR FOR SUSPEND SYSTEMS" (further identified as Attorney Docket No. BC9-94-109);

application Ser. No. 08/301,464, filed Sep. 7, 1994, now U.S. Pat. No. 5,511,204, and entitled "PERFORMING SYSTEM TASKS AT POWER-OFF USING SYSTEM MANAGEMENT INTERRUPT" (further identified as Attorney Docket No. BC9-94-112);

application Ser. No. 08/302,066, filed Sep. 7, 1994, now U.S. Pat. No. 5,603,038, and entitled "AUTOMATIC RESTORATION OF USER OPTIONS AFTER POWER LOSS" (further identified as Attorney Docket No. BC9-94-113);

application Ser. No. 08/301,943, filed Sep. 7, 1994, now U.S. Pat. No. 5,560,023, and entitled "AUTOMATIC BACKUP SYSTEM FOR ADVANCED POWER MANAGEMENT (APM)" (further identified as Attorney Docket No. BC9-94-148).

application Ser. No. 08/639,639, filed Apr. 29, 1996, and entitled "SWITCH PRESS SUSPEND INDUCED BY AC POWER DISTURBANCE" (further identified as Attorney Docket No. RP9-96-007).

BACKGROUND OF THE INVENTION

1. Field of the Invention

The present invention relates generally to personal computer systems and, more specifically, to a personal computer system having power management circuitry and a power supply which are operative to save the state of the computer system to a non-volatile storage device (suspend) when an AC power disturbance occurs while the computer system is in a normal operating state or a standby state.

2. Description of Related Art

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's Personal Computer AT and IBM's Aptiva.

Personal computer systems are typically used to run software to perform such diverse activities as word processing, manipulation of data via spread-sheets, collection and relation of data in databases, displays of graphics, design of electrical or mechanical systems using system-design software, etc.

The first four related applications disclose a computer system having four power management states: a normal operating state, a standby state, a suspend state, and an off state. One switch is used to change between the off state, the normal operating state, and the suspend state.

The normal operating state of the computer system of the present invention is virtually identical to the normal operating state of any typical desktop computer. Users may use applications and basically treat the computer as any other. One difference is the presence of a power management driver, which runs in the background (in the BIOS and the operating system), transparent to the user. The portion of the power management driver in the operating system (OS) is the Advanced Power Management (APM) advanced programming interface written by Intel and Microsoft, which is now present in most operating systems written to operate on Intel's 80X86 family of processors. The portion of the power management driver in BIOS (APM BIOS) communicates with the APM OS driver. The APM OS driver and the APM BIOS routines together control the computer's transition to and from the other three states.

The second state, the standby state, uses less power than the normal operating state, yet leaves any applications executing as they would otherwise execute. In general, power is conserved in the standby state by placing devices in their respective low-power modes. For example, power is conserved in the standby state by ceasing the revolutions of the fixed disk within the hard drive and by ceasing generating the video signal.

The third state is the suspend state. In the suspend state, computer system consumes an extremely small amount of power. The suspended computer consumes very little power from the wall outlet. The only power consumed is a small amount of power to maintain the circuitry that monitors the switch from a battery inside the computer system (when the system is not receiving AC power) or a small amount of power generated at an auxiliary power line by the power supply (when the system is receiving AC power).

This small use of power is accomplished by saving the state of the computer system to the fixed disk storage device (the hard drive) before the power supply is turned "off." To enter the suspend state, the computer system interrupts any executing code and transfers control of the computer to the power management driver. The power management driver ascertains the state of the computer system and writes the state of the computer system to the fixed disk storage device. The state of the CPU registers, the CPU cache, the system memory, the system cache, the video registers, the video memory, and the other devices' registers are all written to the fixed disk. The entire state of the system is saved in such a way that it can be restored without the code applications being adversely affected by the interruption. The computer then writes data to the non-volatile CMOS memory indicating that the system was suspended. Lastly, the computer causes the power supply to stop producing power. The entire state of the computer is safely saved to the fixed disk storage device, system power is now "off," and computer is now only receiving a small amount of regulated power from the power supply to power the circuitry that monitors the switch.

The fourth and final state is the off state. In this state, the power supply ceases providing regulated power to the computer system, but the state of the computer system has not been saved to the fixed disk. The off state is virtually identical to typical desktop computers being turned off in the usual manner.

Switching from state to state is handled by the power management driver and is typically based on closure events of a single switch, a flag, and two timers: the inactivity standby timer and the inactivity suspend timer. The system has a single power button. This button can be used to turn on the computer system, suspend the state of the system, restore the state of the system, and turn off the system.

Power disturbances or outages can occur at any time and can rarely be predicted. Data in a personal computer system which is not backed up to a non-volatile storage medium, will be lost in the event of such a power disturbance. Power disturbances or outages that are less than one second can cause a personal computer to lose data. One solution is an uninterruptable power supply (UPS). A UPS can be used to sustain power to personal computers, servers or mainframes when power from the wall outlet is disturbed or lost allowing the computer system to remain in its normal operating state without interruption to the user. However, there is a time limit as to how long the UPS can provide power to the computer system. Consequently, if the power disturbance lasts longer than the amount of time that the UPS can supply power (i.e., when the UPS's stored charge expires), the computer system will lose power and the data and applications currently being used, displayed, etc. will be lost. Moreover, uninterruptable power supplies are very expensive and are typically used by corporate users. In addition, the longer that the UPS can supply power, the higher the price of the UPS. Thus, few small business and home users can afford an UPS and are therefore more likely to lose data during a power disturbance or outage.

It is therefore desirable to provide a reliable and inexpensive system for retaining data in the event of an AC power disturbance which can be integrated into personal computer systems having power management (e.g., suspend/resume) features.

SUMMARY OF THE INVENTION

The present invention is directed to a personal computer system which is capable of operating in at least two states of power management, a normal operating state in which code is executed normally by said computer and a suspend state. The system includes a CPU capable of executing the code and power management circuitry in circuit communication with the CPU for selectively changing the state of the computer system between the normal operating state and the suspend state responsive to a power down imminent (PDI) control signal. A power supply is in circuit communication with the power management circuitry and includes circuitry for selectively providing system power from an external source to the computer system responsive to the power management circuitry and further characterized by having circuitry for providing auxiliary power to the power management circuitry. The power supply further includes circuitry for providing system power to the computer system and auxiliary power to the power management circuitry from an internal source.

The power supply is operative to generate the PDI control signal to the power management circuitry when the system is in the normal operating state (or a standby state) and the external source stops providing power at a predetermined level (e.g., brownout or blackout) to the power supply. In addition, simultaneous with activating the PDI signal the power supply switches to its backup internal power such that the power supply provides system power to the computer system and auxiliary power to the power management circuitry from the internal (backup) source. The power management circuitry is further characterized in that while in the normal operating state (or a standby state), responsive to the power supply activating the PDI control signal, the power management circuitry causes the computer system to change to the suspend state wherein the entire state of the system is safely saved to a non-volatile storage device.

The power supply used in the present invention need only have sufficient backup power to allow the computer system to perform the suspend routine regardless of how long the AC power disturbance lasts. Accordingly, the cost of such a power supply is substantially lower than the cost of a power supply which can supply power for the duration of the AC power disturbance. In addition, computer systems which have the latter power supply suffer from the disadvantage that data will still be lost once the power supply's stored charge expires while in the system of the present invention data is never lost since it is saved to the non-volatile storage device prior to the expiration of the backup power.

BRIEF DESCRIPTION OF THE DRAWINGS

FIGS. 3, 3A–3D show a block diagram of certain components of the personal computer of FIGS. 1 and 2;

FIGS. 7, 7A, 7B and 7C are electrical schematic diagrams of the power management circuitry of the present invention, showing the various interfaces to other Figures;

FIGS. 9A, 9B, 9C, 9D and 9E are flow charts showing the details of the Boot-Up Routine of the present invention;

FIG. 11 is a flow chart showing the details of the SMI routine of the present invention.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. This application is written for those very familiar with all aspects of computer system design.

Figure 1:
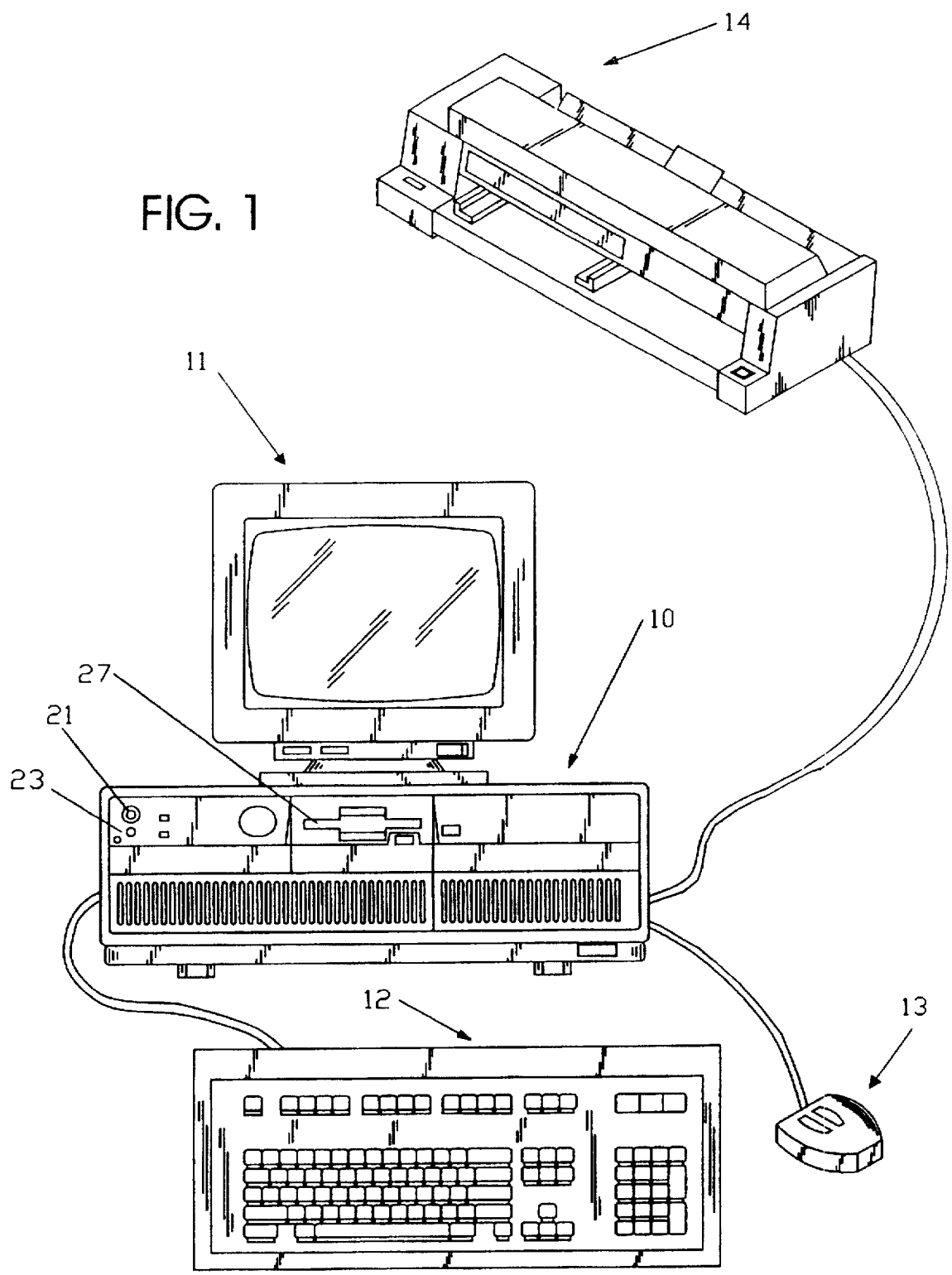
FIG. 1 is a perspective view of a personal computer embodying this invention.

Referring now more particularly to the accompanying drawings, a microcomputer system embodying the present invention is there shown and generally indicated at 10 (FIG. 1). As mentioned hereinabove, the computer 10 may have an associated display monitor 11, keyboard 12, mouse 13, and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the operating components of the microcomputer.

Figure 2:
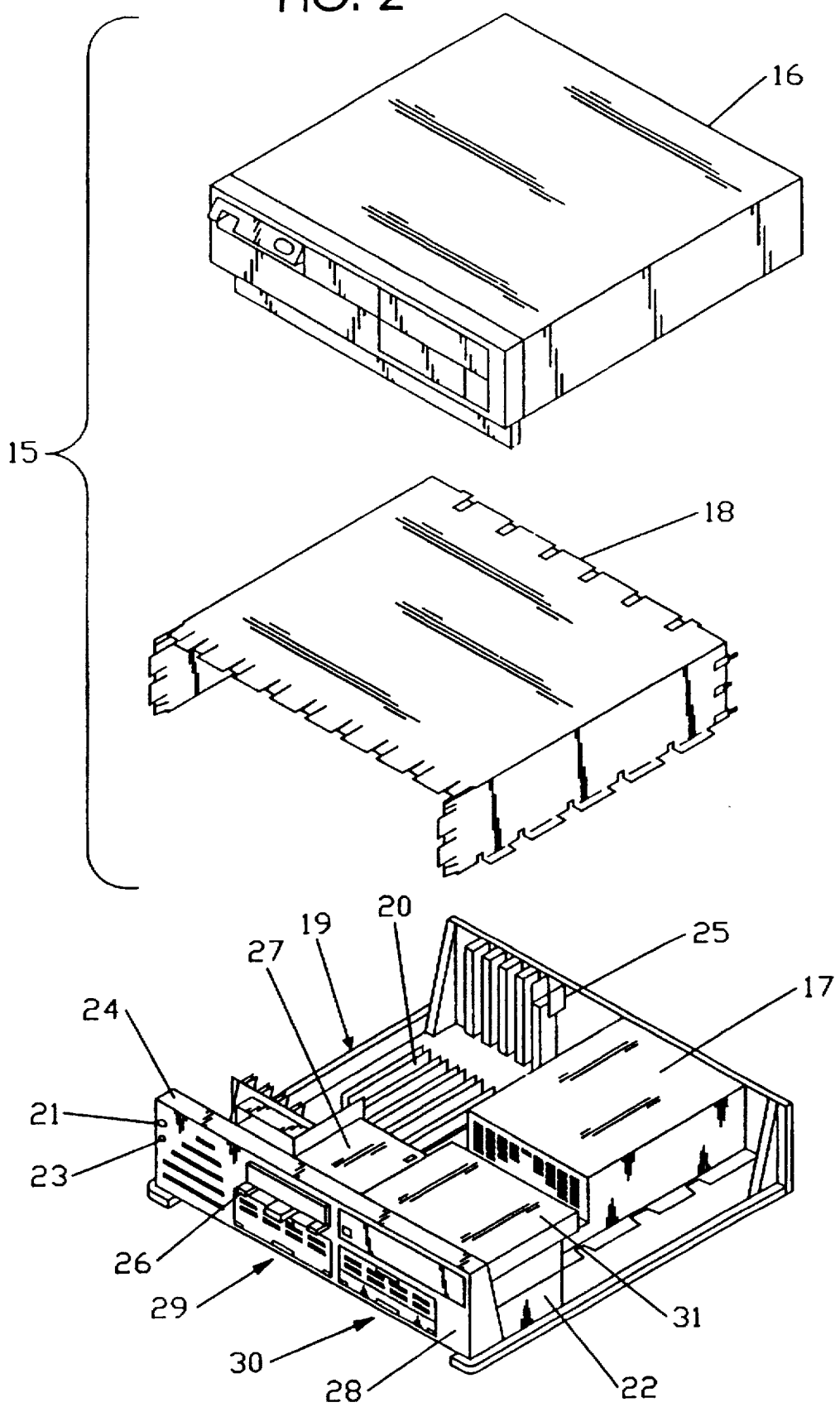
FIG. 2 is an exploded perspective view of certain elements of the personal computer of FIG. 1 including a chassis, a cover, an electromechanical direct access storage device and a planar board and illustrating certain relationships among those elements.

The system 10 has a power supply 17, a power button 21, also herein referred to as switch 21, and a power/feedback LED 23. Unlike in the usual power switch in a typical system, the switch 21 does not switch AC line power to and from the power supply 17, as will be explained below. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch). One floppy disk drive is indicated at 27 in FIG. 1, and is a removable medium direct access storage device capable of receiving a diskette inserted thereinto and using the diskette to receive, store and deliver data as is generally known. One hard disk drive is indicated at 31 and is a fixed medium direct access storage device capable of storing and delivering data as is generally known.

Figure 3B:
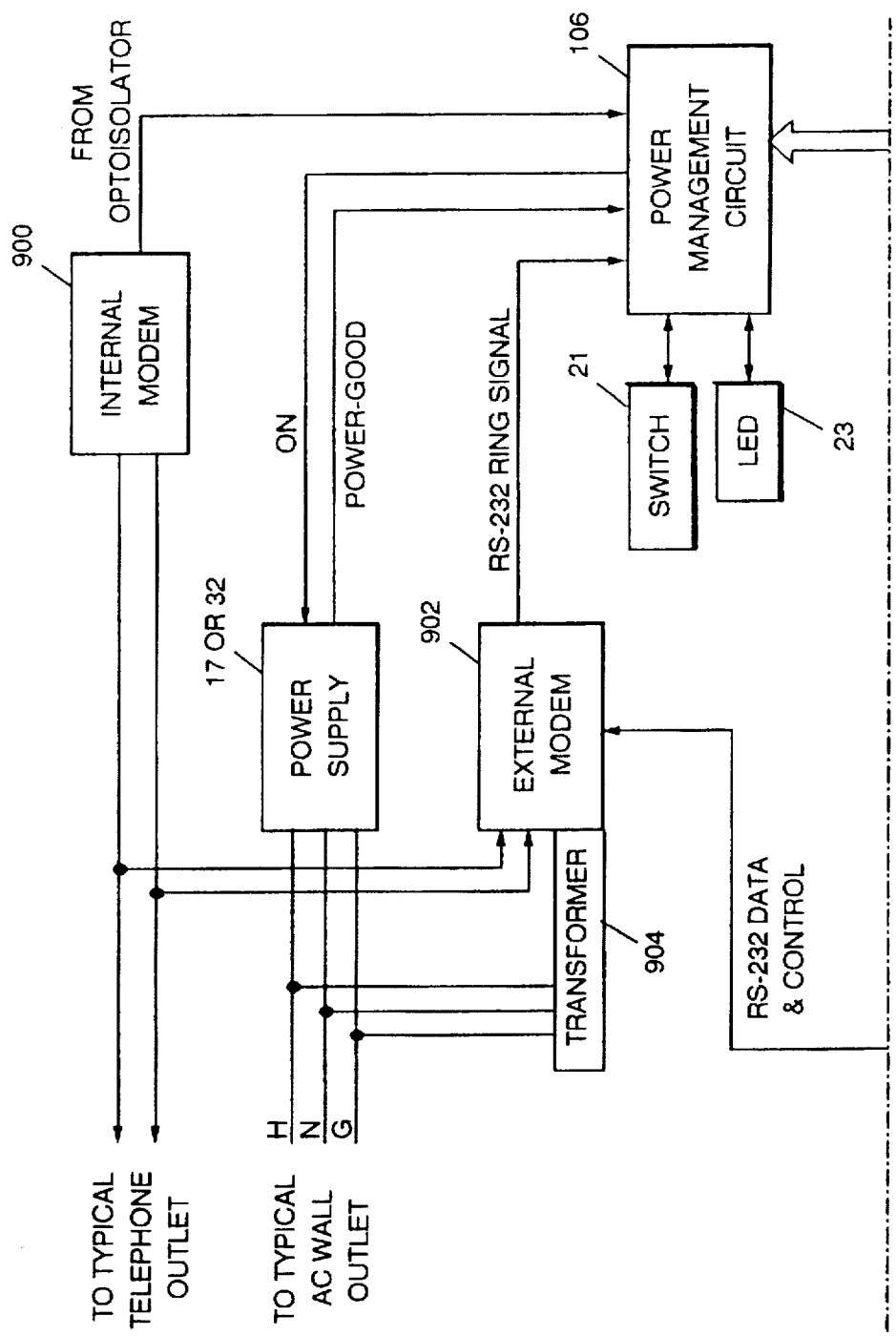
Figure 3D:
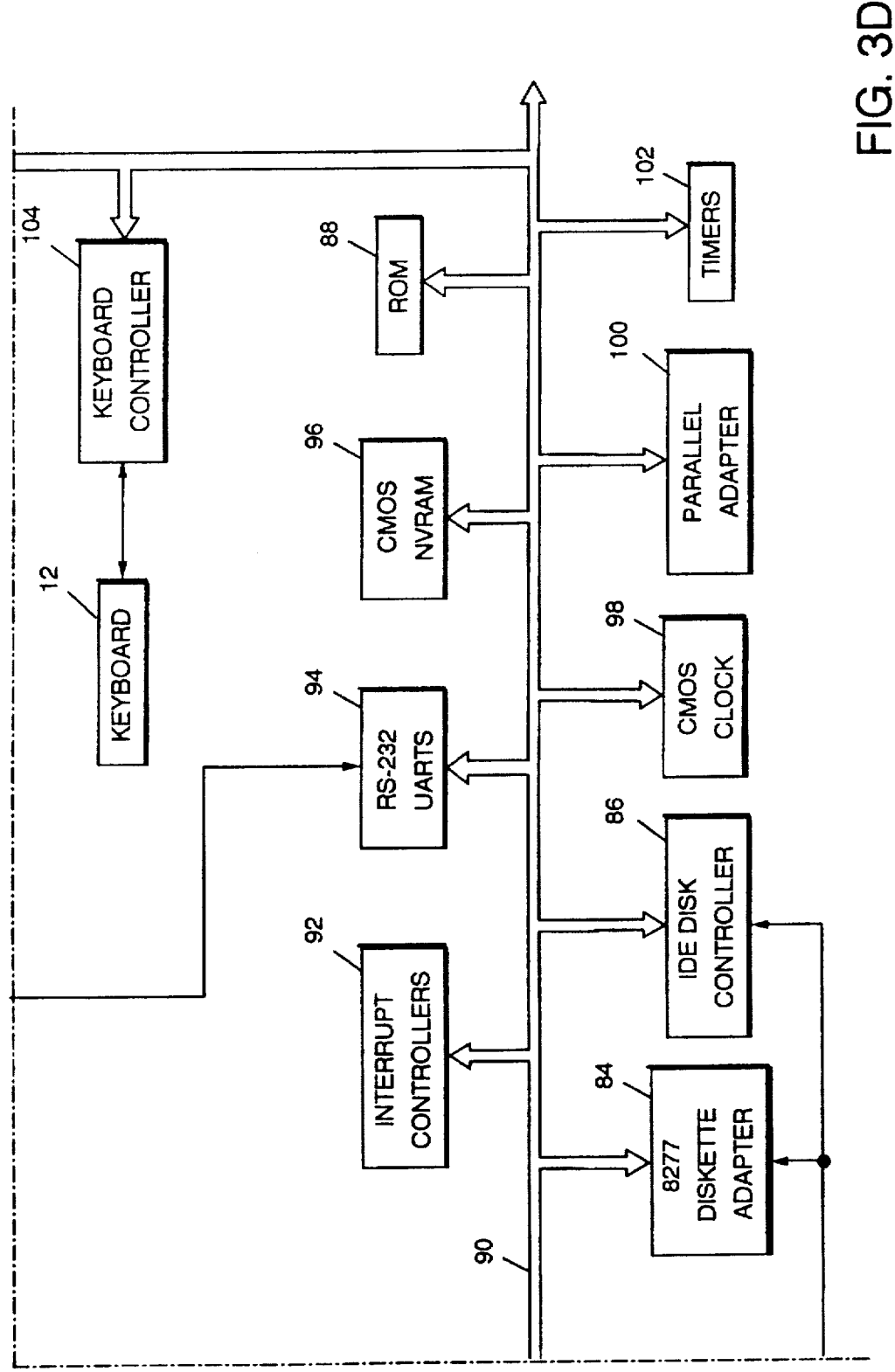

Prior to relating the above structure to the present invention, a summary of the operation in general of the personal computer system 10 may merit review. Referring to FIGS. 3A and 3B, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 40, also herein CPU 40, comprised of a microprocessor, which is connected by a high speed CPU local bus 42 through a memory control unit 46, which is further connected to a volatile random access memory (RAM) 53. The memory control unit 46 is comprised of a memory controller 48, an address multiplexer 50, and a data buffer 52. The memory control unit 46 is further connected to a random access memory 53 as represented by the four RAM modules 54. The memory controller 48 includes the logic for mapping addresses to and from the microprocessor 40 to particular areas of RAM 53. This logic is used to reclaim RAM previously occupied by BIOS. Further generated by memory controller 48 is a ROM select signal (ROMSEL), that is used to enable or disable ROM 88.

While the present invention is described hereinafter with particular reference to the system block diagram of FIGS. 3A and 3B, it is to be understood at the outset of the description which follows that it is contemplated that the apparatus and methods in accordance with the present invention may be used with other hardware configurations of the planar board. For example, the system processor 40 could be an Intel Pentium processor, Cyrix 586-P75 processor or Advanced Micro Devices 80486 processor or any other microprocessor that has a system management interrupt (SMI). As used herein, reference to an "SL" enhanced microprocessor generally intends such a microprocessor.

Returning now to FIGS. 3A and 3B, the CPU local bus 42 (comprising data, address and control components, not shown) provides for the connection of the microprocessor 40, a math coprocessor 44 (if not internal to the CPU 40), a video controller 56, a system cache memory 60, and a cache controller 62. The video controller 56 has associated with it a monitor (or video display terminal) 11 and a video memory 58. Also coupled on the CPU local bus 42 is a buffer 64. The buffer 64 is itself connected to a slower speed (compared to the CPU local bus 42) system bus 66, also comprising address, data and control components. The system bus 66 extends between the buffer 64 and a further buffer 68. The system bus 66 is further connected to a bus control and timing unit 70 and a DMA unit 71. The DMA unit 71 is comprised of a central arbiter 82 and a DMA controller 72. An additional buffer 74 provides an interface between the system bus 66 and an optional feature bus such as the Industry Standard Architecture (ISA) bus 76. Connected to the bus 76 are a plurality of I/O slots 78 for receiving ISA adapter cards (not shown). ISA adapter cards are pluggably connected to the I/O slots 78 and may provide additional I/O devices or memory for the system 10.

An arbitration control bus 80 couples the DMA controller 72 and central arbiter 82 to the I/O slots 78, a diskette adapter 84, and an Integrated Drive Electronics (IDE) fixed disk controller 86.

While the microcomputer system 10 is shown with a basic 4 megabyte RAM module 53, it is understood that additional memory can be interconnected as represented in FIGS. 3A and 3B by the addition of optional higher-density memory modules 54. For purposes of illustration only, the present invention is described with reference to the basic four megabyte memory module.

Figure 7A:
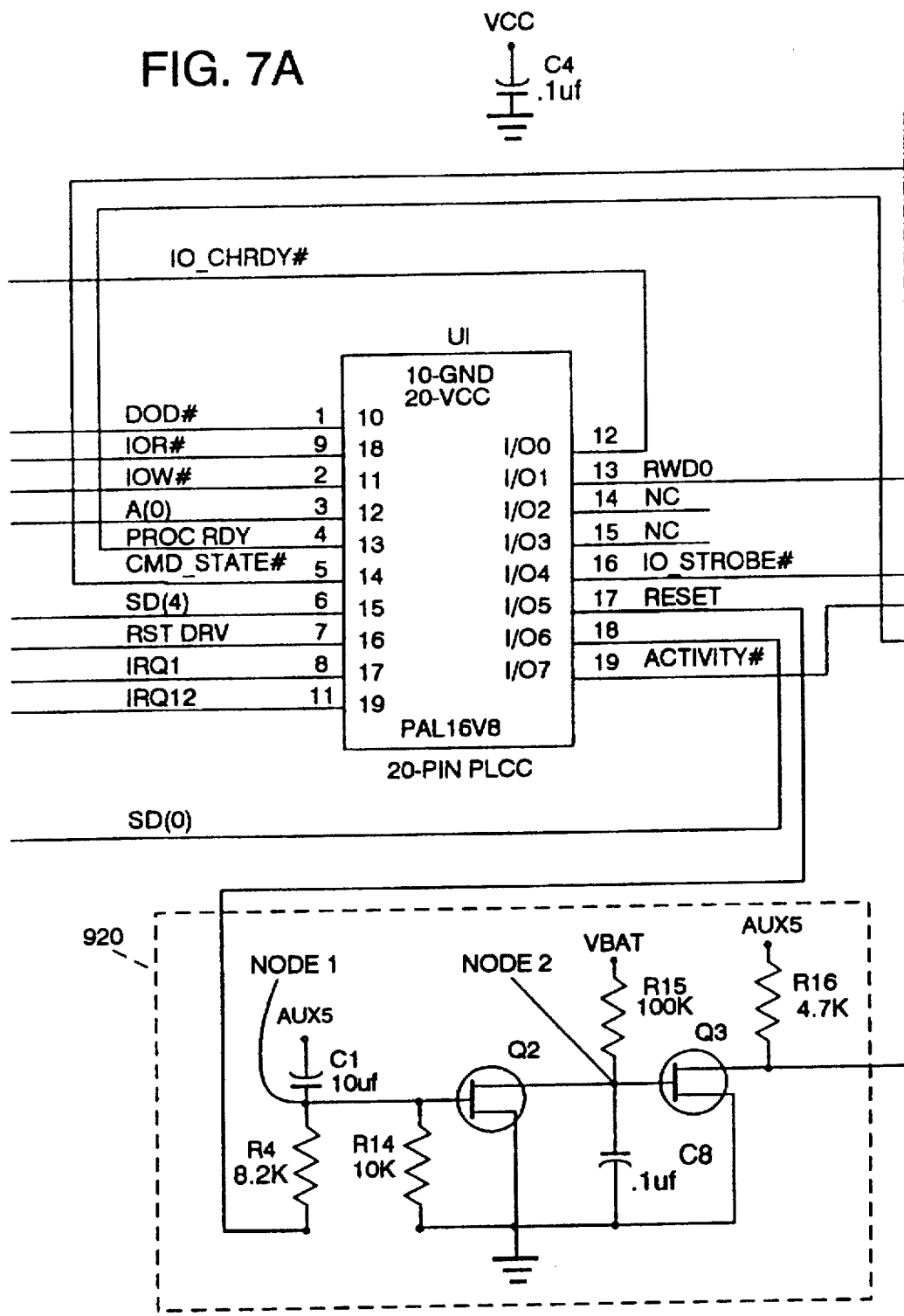
Figure 7B:
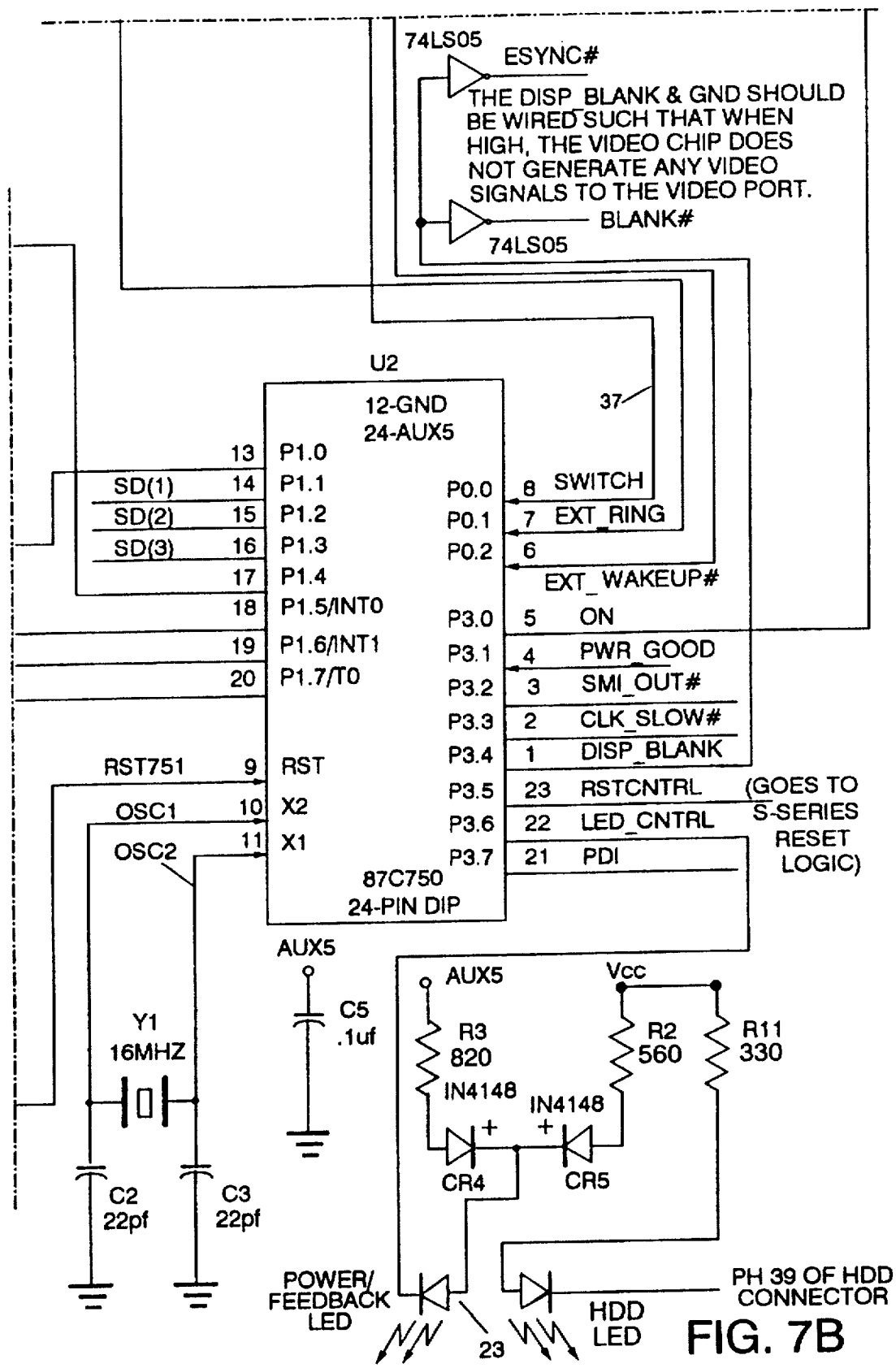
Figure 7C:
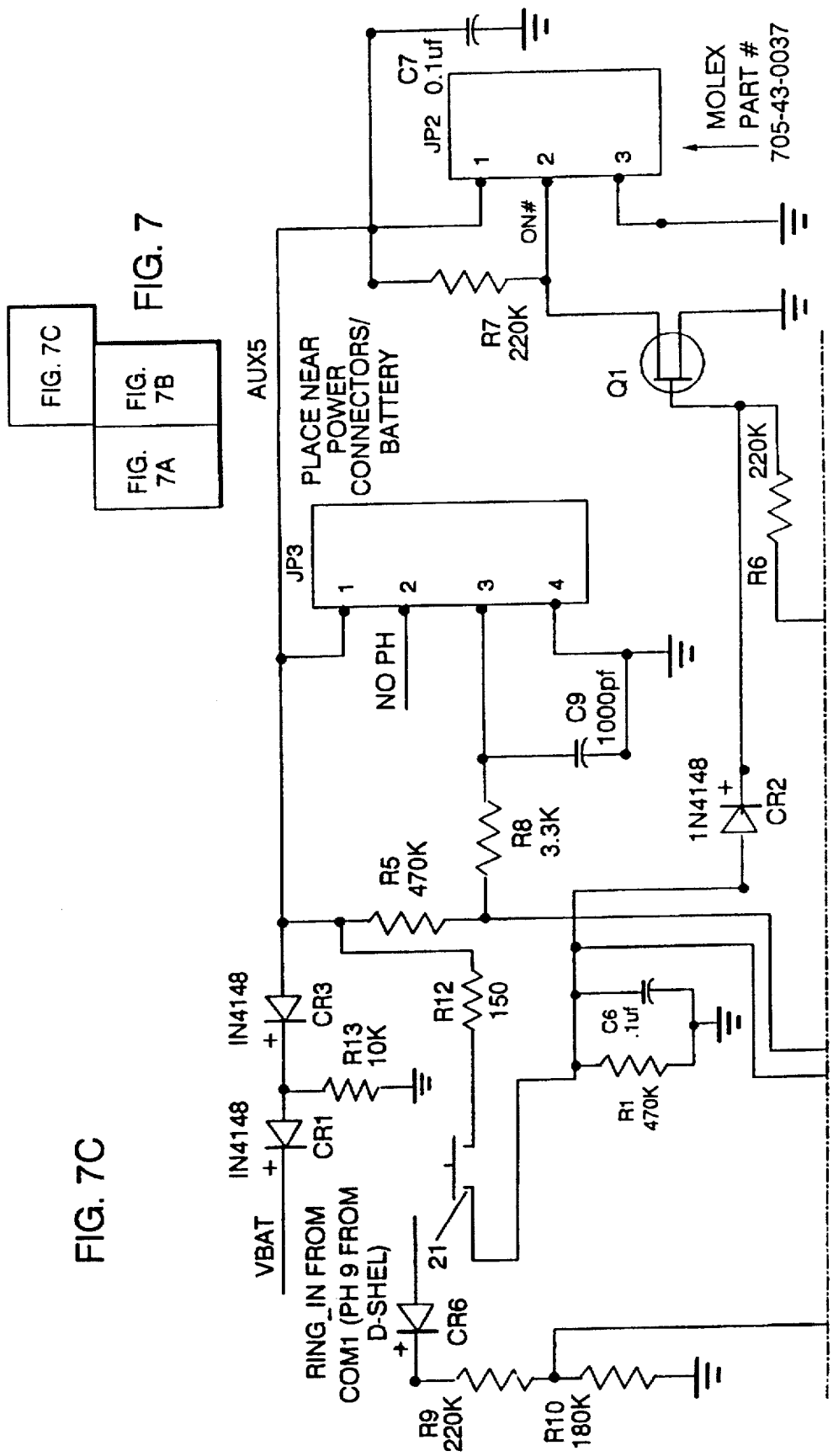

A latch buffer 68 is coupled between the system bus 66 and a planar I/O bus 90. The planar I/O bus 90 includes address, data, and control components respectively. Coupled along the planar I/O bus 90 are a variety of I/O adapters and other components such as the diskette adapter 84, the IDE disk adapter 86, an interrupt controller 92, an RS-232 adapter 94, nonvolatile CMOS RAM 96, also herein referred to as NVRAM 96, a CMOS real-time clock (RTC) 98, a parallel adapter 100, a plurality of timers 102, the read only memory (ROM) 88, the 8042 104, and the power management circuitry 106. The 8042, shown at 104, is the slave processor that interfaces with the keyboard 12 and the mouse 13. The power management circuitry 106 is in circuit communication with the power supply 17, the switch 21, the power/feedback LED 23, and an internal modem 900 and/or an external modem 902. The external modem is typically connected to a transformer 904, which is connected to a typical wall outlet, as is known to those skilled in the art. The modems 900, 902 are connected to a typical telephone outlet. The power management circuitry 106 is shown in FIG. 7 and is more fully described in the text accompanying FIG. 7.

The read only memory 88 includes the BIOS that is used to interface between the I/O devices and the operating system of the microprocessor 40. BIOS stored in ROM 88 can be copied into RAM 53 to decrease the execution time of BIOS. ROM 88 is further responsive (via ROMSEL signal) to memory controller 48. If ROM 88 is enabled by memory controller 48, BIOS is executed out of ROM. If ROM 88 is disabled by memory controller 48, ROM is not responsive to address inquiries from the microprocessor 40 (i.e. BIOS is executed out of RAM).

The real-time clock 98 is used for time of day calculations and the NVRAM 96 is used to store system configuration data. That is, the NVRAM 96 will contain values which describe the present configuration of the system. For example, NVRAM 96 contains information describing the capacity of a fixed disk or diskette, the type of display, the amount of memory, time, date, etc. Furthermore, these data are stored in NVRAM whenever a special configuration program, such as SET Configuration, is executed. The purpose of the SET Configuration program is to store values characterizing the configuration of the system to NVRAM.

Nearly all of the above devices comprise volatile registers. To prevent the unnecessary cluttering of the drawings, the registers of a particular device will be referenced to that device. For example, the CPU registers will be referred to as the CPU 40 registers and the video controller registers will be referenced as the video controller 56 registers.

Figure 4:
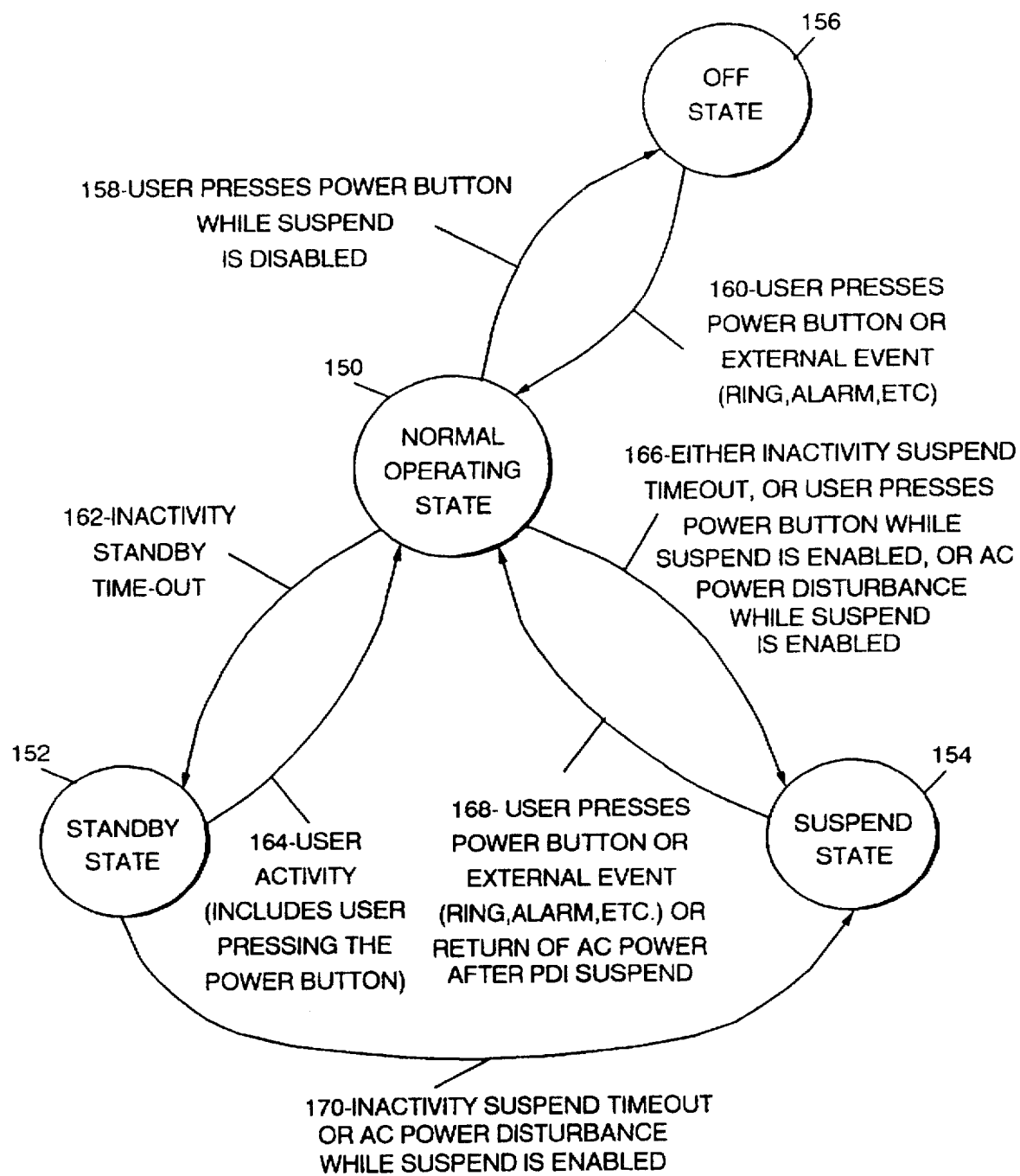
FIG. 4 is a state diagram of the computer system of the present invention, showing the four system states: normal, standby, suspend, and off.

Referring now to FIG. 4, a state diagram of the computer system of the present invention is shown. The computer system 10 of the present invention has four states: a normal operating state 150, a standby state 152, a suspend state 154, and an off state 156. The transitions between the states shown in FIG. 4 are meant to be descriptive but not limiting. Consequently, additional events may alternatively be used to cause state transitions.

The normal operating state 150 of the system 10 is virtually identical to the normal operating state of any typical desktop computer. Users may use applications and basically treat the computer as any other. One difference, transparent to the user, is the presence of a power management driver in the operating system (the "APM OS driver"), which runs in the background (in the BIOS and the operating system), and various APM BIOS routines. The portion of the power management driver in the operating system (OS) is the Advanced Power Management (APM) advanced programming interface written by Intel and Microsoft, which is now present in most operating systems written to operate on Intel's 80X386 or higher family of processors. The portion of the power management driver in BIOS (APM BIOS) communicates with the APM OS driver.

The APM BIOS routines relevant to the present invention are discussed in the text below and include the Suspend Routine and the Boot-Up Routine. Other APM BIOS routines such as the Resume Routine, the Supervisor Routine, the Save CPU State Routine, the Restore CPU State Routine and the APM BIOS Routing Routine are described more fully in the above-mentioned related applications which are hereby incorporated herein by reference. The power management driver in the OS and the APM BIOS routines control the computer's transition between the four states. A reference to the word "APM" by itself generally is a reference to the APM OS driver, although the context may dictate otherwise.

The second state, the standby state 152, uses less electrical power than the normal operating state 150, yet leaves any applications executing as they would otherwise execute. In general power is saved in the standby state 152 by the code placing devices into respective low power modes. Electrical power can be conserved in the standby state 152 by ceasing the revolutions of the fixed disk (not shown) within the fixed disk storage device 31, by ceasing generating the video signal, and by putting the CPU 40 in a low power mode, as will be more fully explained below. However, this is not intended to be limiting and other methods may be used to reduce power consumption, such as slowing or stopping the CPU clock or allowing other peripherals (modem, LAN cards) to enter a low power state.

For example, electrical power can be conserved in three separate ways. First, in the normal operating state 150, the fixed disk within the fixed disk storage device 31 is constantly spinning at, e.g., 3600, 4500, or 5400 revolutions per minute (RPM). In the standby state 152, the IDE disk controller 86 is given the command to cause the fixed disk storage device 31 to enter a low-power mode (the fixed disk inside the fixed disk storage device 31 ceases spinning), thereby conserving the power the motor (not shown) inside the fixed disk storage device 31 typically consumes while spinning the fixed disk.

Second, in the normal operating state 150, the video controller 56 of the computer system constantly generates a video signal (HSYNC, VSYNC, R, G, B, etc. as is well known in the art) corresponding to the image seen on the video display terminal 11. In the standby state 152 the video controller 56 ceases generating the video signal, thereby conserving the electrical power normally consumed by the video controller 56; HSYNC, VSYNC, R, G, and B are all driven to approximately 0.00 VDC. Using a VESA (Video Electronics Standards Association) compliant monitor allows further power savings because VESA compliant monitors turn themselves off when HSYNC and VSYNC are at approximately 0.00 VDC.

Note that some systems have "screen-savers," which cause the screen 11 to become dark to prevent phosphor burn-in of the front surface of the video display terminal. In most of such systems, the video controller 56 is still generating a video signal; it is merely generating a video signal corresponding to a dark screen or a dynamic display. Thus, a computer system executing a screen-saver still consumes the electrical power necessary to generate the video signal.

Third, in the normal operating state 150, the CPU 40 constantly executes commands, thereby consuming electrical power. In the standby state 152 the BIOS issues a HALT instruction in response to the APM CPU Idle Call. Executing a HALT instruction significantly reduces CPU power consumption until the next hardware interrupt occurs. When truly idle, the CPU can remain halted more than 90% of the time.

The third state is the suspend state 154. In the suspend state 154, computer system consumes an extremely small amount of electrical power. The suspended computer consumes less than 100 milliwatts of electrical power. The only power consumed is the small amount of power generated at an auxiliary power line by the power supply (when the system is receiving AC power) to monitor power on events.

This small use of electrical power is accomplished by saving the state of the computer system to the fixed disk storage device (the hard drive) 31 prior to turning the power supply "off." To enter the suspend state 154, the CPU 40 interrupts any applications and transfers program execution control of the CPU to the BIOS in the power management driver. The BIOS ascertains the state of the computer system 10 and writes the entire state of the computer system to the fixed disk storage device 31. The state of the CPU 40 registers, the CPU cache 41, the system RAM 53, the system cache 60, the video controller 56 registers, the video memory 56, and the remaining volatile registers are all written to the fixed disk drive 31. The entire state of the system 10 is saved in such a way that it can be restored without significant usability penalties. That is, the user need not wait for the system to load the operating system, and load the graphical user interface, and application programs as it normally would.

The computer then writes data to the non-volatile CMOS memory 96 indicating that the system was suspended. Lastly, the CPU 40 commands the microcontroller (U2) to cause the power supply 17 to stop providing regulated power to the system through the ±5 VDC and ±12 VDC lines. The computer system 10 is now powered down with the entire state of the computer safely saved to the fixed disk storage device 31. System power is now "off," and the computer is now only receiving a small amount of regulated power from the power supply (AUX5) (when the power supply is receiving AC power from the wall outlet) to power the circuitry that monitors the switch. As will be described in more detail below, after a power down imminent (PDI) suspend is performed, system power and auxiliary power are turned off.

The fourth and final state is the off state 156. The off state 156 is virtually identical to any typical computer system that has been turned off in the usual manner (press on/off switch). In this state, the primary/regulation unit 172 of the power supply 17 ceases providing regulated power to the computer system 10, (with the exception of a small amount of regulated power through AUX5, as will be more fully explained in the text accompanying FIG. 5) but the state of the computer system 10 has not been saved to the fixed disk 31. The suspend state 154 and the off state 156 are similar in that the power supply 17 no longer generates regulated power. They differ in that in the off state 156, the state of the computer system 10 is not saved to the hard drive 31, as it is in the suspend state 154. Moreover, when leaving the off state 156, the computer 10 "boots" as if it is being turned on. That is, any executing code must be started either by the user or automatically by a means such as the AUTOEXEC.BAT file. However, when leaving the suspend state 154, the computer 10 resumes executing where it was when it was interrupted.

FIG. 4 also shows a general overview of the events that cause transitions between the four states. These events will be further explained in the text accompanying FIGS. 5, 6, 7 and 8; however, a cursory explanation may be helpful. The power button 21, three timers (an inactivity standby timer, an inactivity suspend timer and a minutes to wake timer), a Suspend Enable Flag (see FIGS. 7 and 8 and accompanying text) and a power down imminent (PDI) control signal all affect which state the computer enters. In general, the first two timers can be either hardware or CPU code timers, executing on the CPU as a program. They are both preferably CPU code timers, executing from the BIOS data segments. The timers are more fully explained in the above-mentioned applications.

Figure 10A:
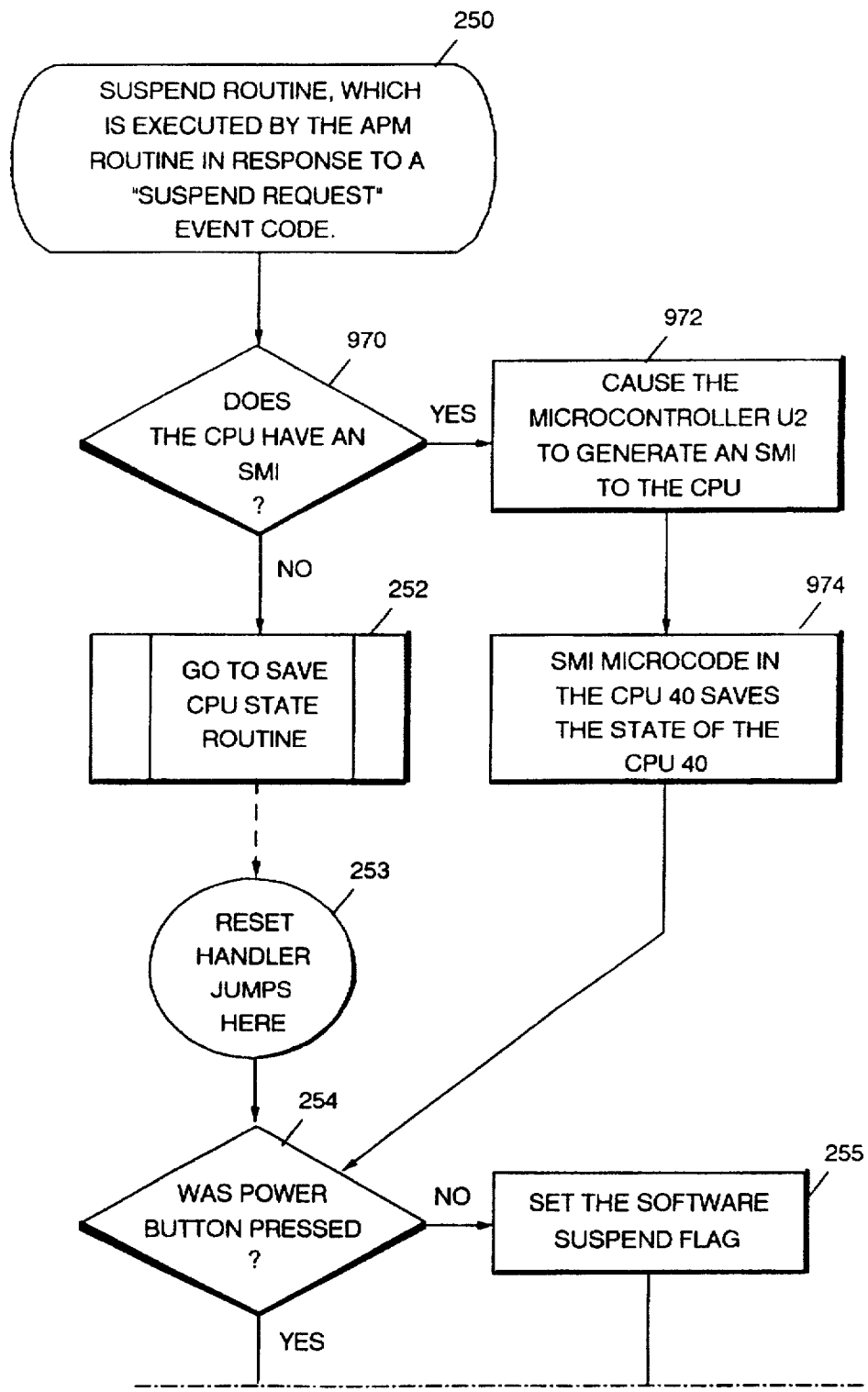
FIGS. 10A, 10B, 10C, 10D, 10E, 10F and 10G are flow charts showing the details of the Suspend Routine of the present invention.
Figure 10:
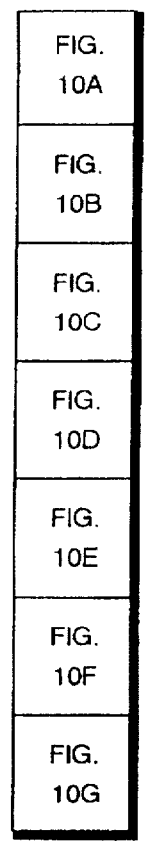
Figure 10B:
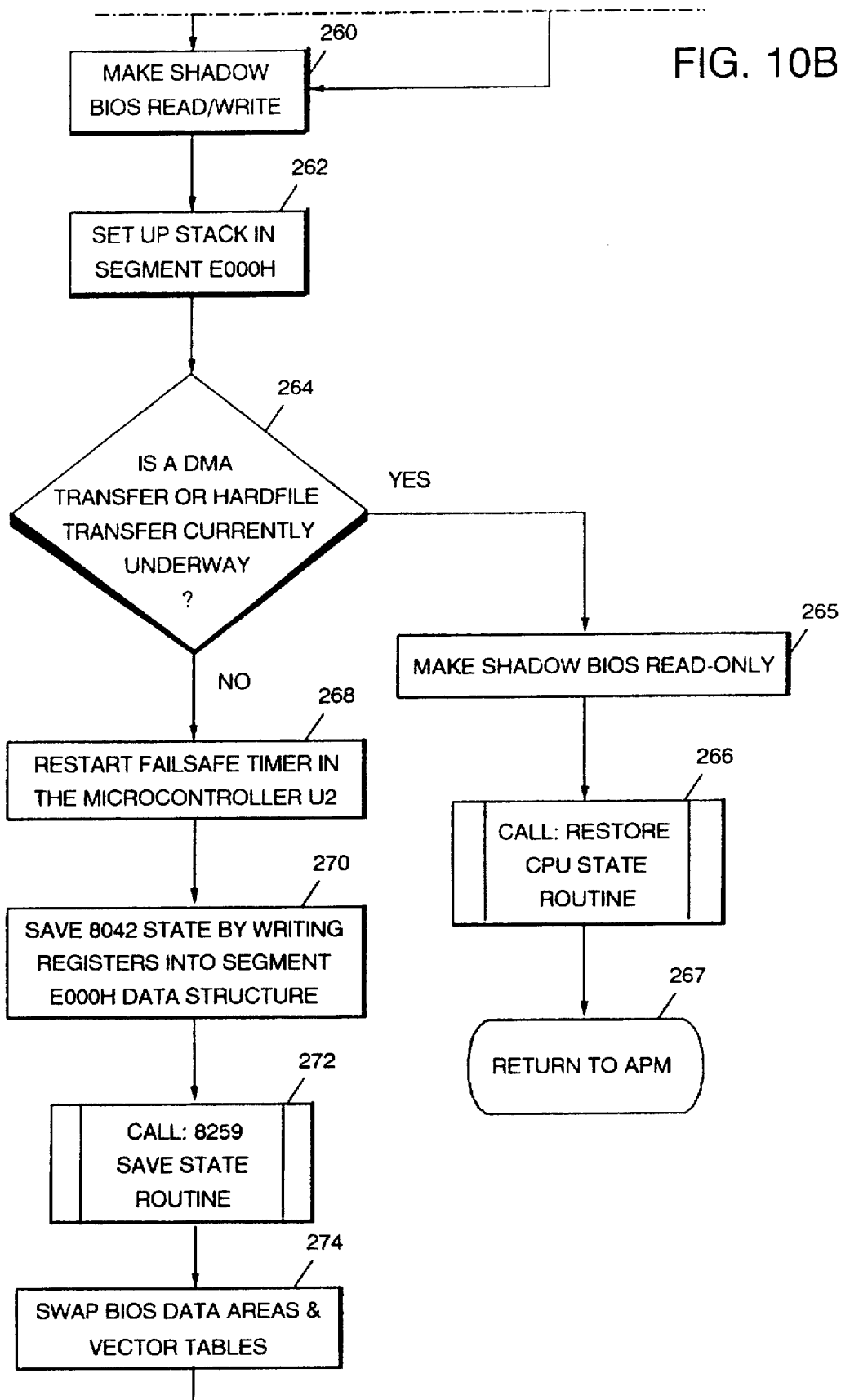
Figure 10C:
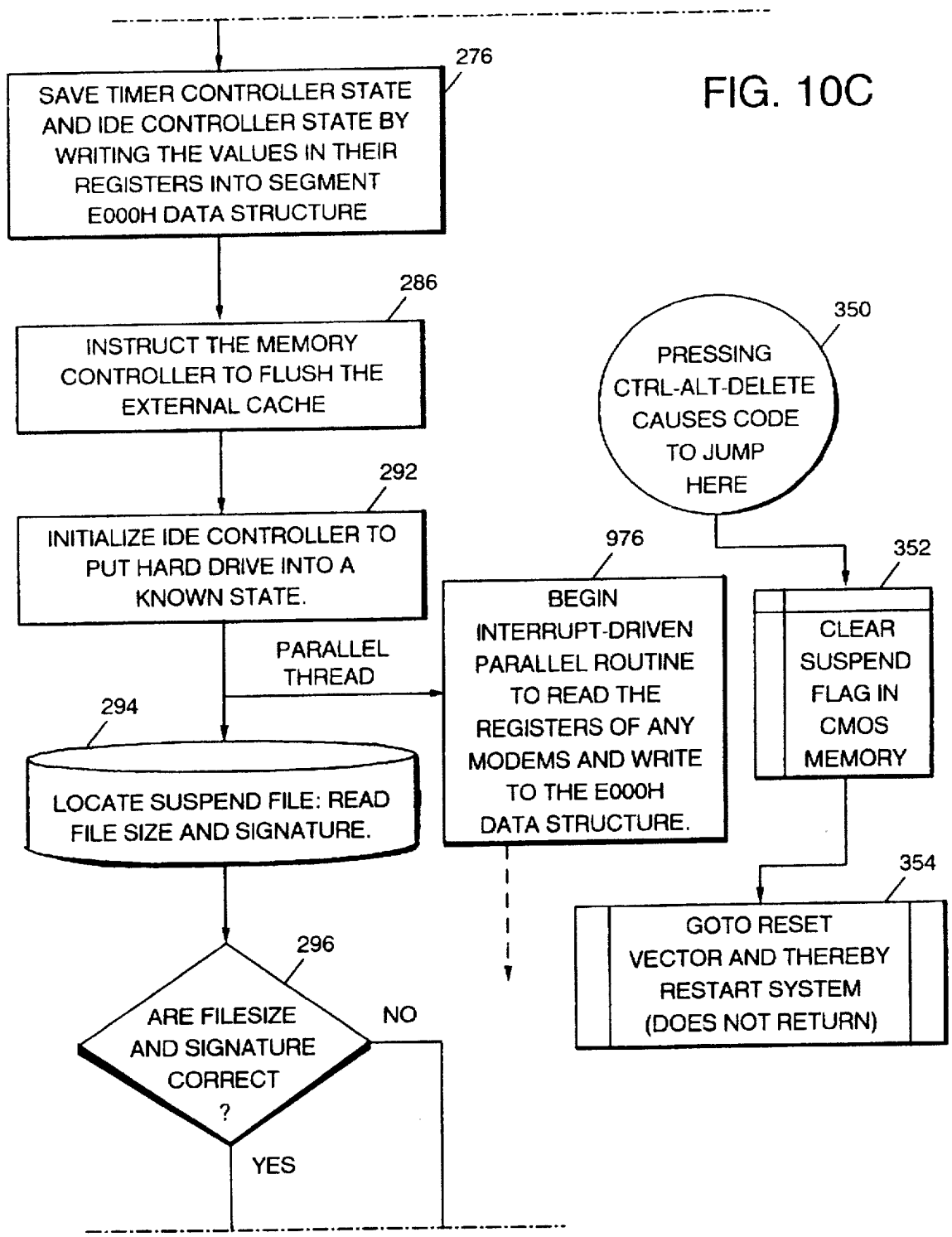
Figure 10E:
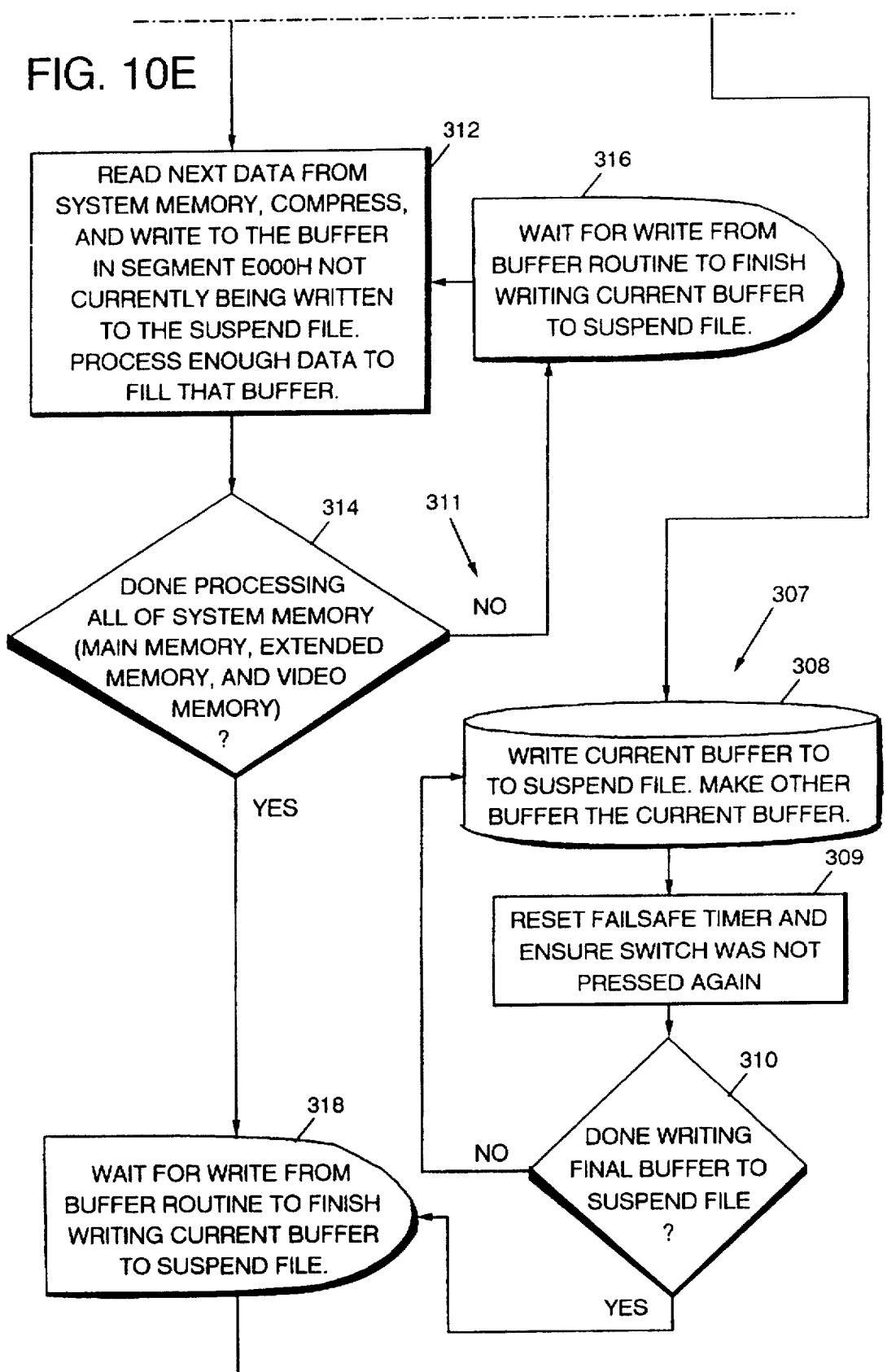
Figure 10F:
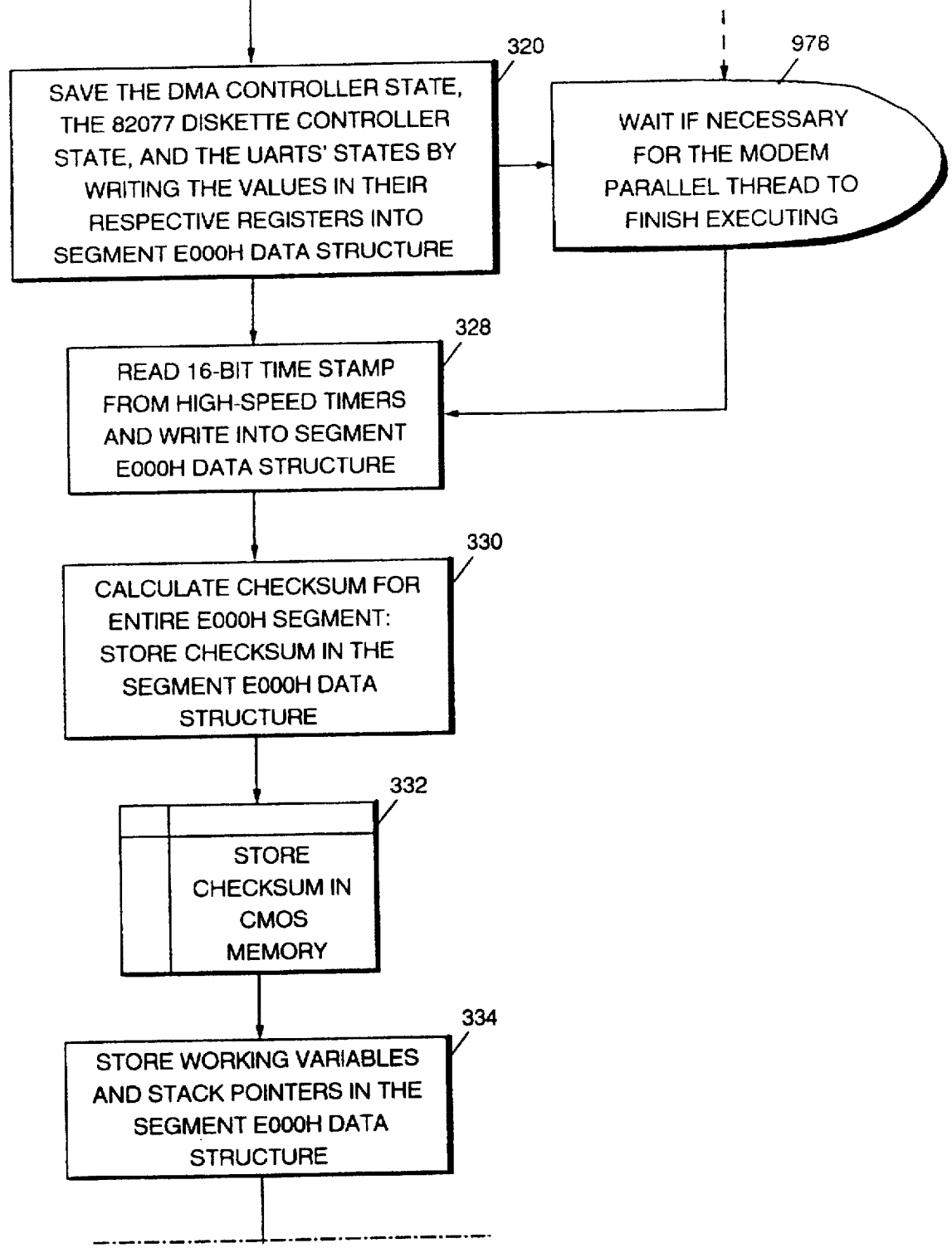

The Suspend Enable Flag is a CPU-manipulable and readable latch within the NVRAM 96 which will be more fully explained in the text accompanying FIG. 10. In short, putting this bit in one mode causes a press of the switch 21 to place the system 10 into the off state 156 and putting this bit into another mode causes a press of the switch 21 to place the system 10 into the suspend state 154. If the system 10 is in the normal operating state 150 and the power button 21 is pressed while the Suspend Enable Flag is CLEARed, then the system 10 enters the off state 156, as shown at 158. If the system 10 is in the off state 156 and the power button 21 is pressed, then the system 10 enters the normal operating state 150, as shown at 160. In addition, several "external events," which are explained more fully below, can cause the system to transition from the off state 156 to the normal operating state 150.

If the computer system 10 is in the normal operating state 150, one event can cause the computer to enter the standby state 152: if the inactivity standby timer expires, the computer system 10 will change to the standby state 152, as shown at 162. In the alternative, the system can provide a means, such as a dialog box, a switch, or other input device, for the user to force the system into the standby state immediately. While in the standby state 152, any system or user activity of the kind previously described, including the user pressing the power button 21, will cause the computer 10 to leave the standby state 152 and re-enter the normal operating state 150, as shown at 164.

Pressing the power button 21 causes the system to change from the standby state 152 to the normal operating state 150 to prevent user confusion. Even if idle, the CPU 40 will soon test whether the switch was pressed. Hardware interrupts remove the CPU 40 from the idle state approximately 20 times per second; thereafter during the next APM Get Event, the microcontroller U2 is queried to determine whether the switch 21 was pressed.

If the computer system 10 is in the normal operating state 150, three events can cause it to enter the suspend state 154. First, if the inactivity suspend timer expires, the computer system 10 will change to the suspend state 154, as shown at 166. Second, the user can cause the computer 10 to enter the suspend state 154 immediately by pressing the power button 21 while the Suspend Enable Flag written to NVRAM 96 is SET, also shown at 166. In the alternative, additionally, the APM driver can issue a suspend request via a "Set Power State: Suspend" command, which causes the APM BIOS driver to call the Suspend Routine. Third, if an AC power disturbance occurs and the Suspend Enable Flag is set, the system 10 will enter the suspend state 154 (described in more detail below).

When the system 10 is in the suspend state 154, several events can cause it to enter the normal operating state 150. The user can change the system 10 to the normal operating state 150 by pressing the power button 21, as shown at 168. If the system 10 entered the suspend state as a result of an AC power disturbance (PDI suspend), the system 10 can change to the normal operating state 150 when AC power at a predetermined level from the wall outlet returns, as shown at 168 and described in more detail below.

In addition, several external events can be used to change the system 10 from the suspend state 154 to the normal operating state 150, at 168, or from the off state 156 to the normal operating state 150, at 160. For example, a telephone ring detect circuit in the microcontroller U2 in the circuitry of FIG. 7 is configured to cause the system 10 to leave the off state 156 or the suspend state 154 and enter the normal operating state 150 when an attached telephone line rings. Such a feature is useful for a system receiving telefax data or digital data. The system enters the normal operating state responsive to the telephone ring, performs the preset functions, such as accepting an incoming facsimile transmission, uploading or downloading files, allowing remote access to the system, etc., and enters the suspend mode again responsive to the expiration of the Inactivity Suspend Timer, only consuming power while the system is in the normal operating state.

Likewise the microcontroller U2 implements a minutes to wake alarm counter, which allows an alarm-type event to cause the system 10 to leave the suspend state 154 or the off state 156 and enter the normal operating state 150. Such a system is useful in sending telefax or digital data at a certain time of day to take advantage of lower telephone usage rates, and performing system maintenance functions, such as backing up the system hard drive 31 with a tape backup system. In the latter case, the minutes to wake alarm is set to turn the machine on a fixed period of time before the scheduler causes the tape backup program to be executed. In the alternative, the APM BIOS scheduler can be used to cause the execution of the tape backup program.

Lastly, if the system 10 is in the standby state 152 and either (1) the inactivity suspend timer expires or (2) an AC power disturbance occurs and the Suspend Enable Flag is set, then the computer 10 changes to the suspend state 154 as shown at 170. The system 10 cannot change back from the suspend state 154 to the standby state 152, but may only transition to the normal operating state 150 as described in the text accompanying transition 168.

Obviously, the computer system 10 cannot instantaneously change states. In each transition from one of the four states, a certain period of time will be required to make the necessary system changes. The details of each transition relevant to the present invention will be explained in the text accompanying FIGS. 5 through 10.

Figure 5:
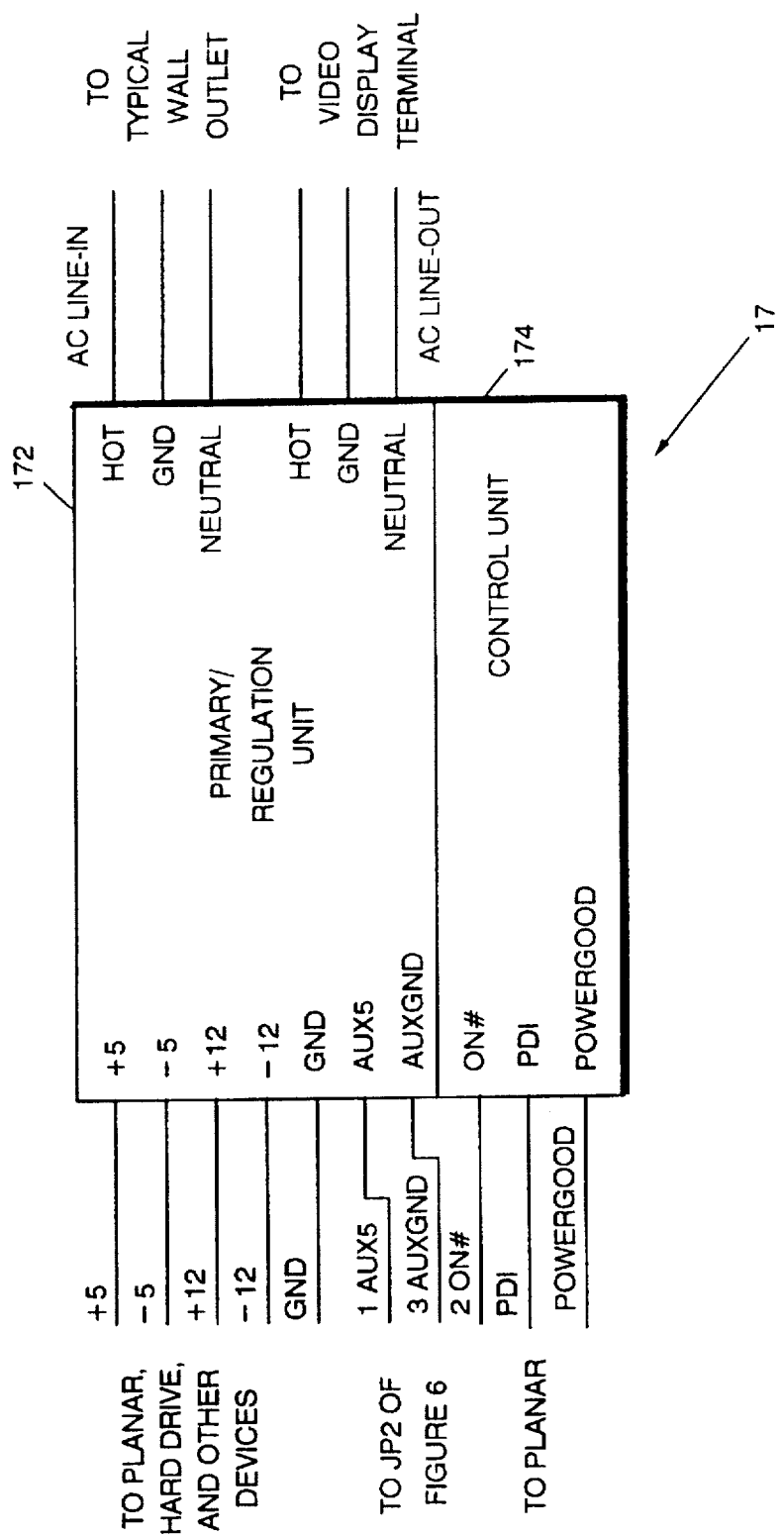
FIG. 5 is a block diagram showing the relevant portions of the power supply.

Before discussing the details of the code executing on the CPU 40, it may be helpful first to discuss the hardware required to achieve the four states. A block diagram of one embodiment of the power supply of the present invention is shown in FIG. 5. The power supply 17 has two units: a control unit 174 and a primary/regulation unit 172. Power supply 17 also contains internal energy (backup power storage) within the primary regulation unit 172 which can maintain power to power supply 17 for a predetermined length of time after an AC power disturbance (described in more detail below). The power supply 17 has several inputs: AC Line-In, which accepts either 115 VAC or 220 VAC from a typical wall outlet, and ON# which controls the regulation activity of the power supply 17. The power supply 17 has several outputs: an optional AC Line-Out, ±5 VDC, ±12 VDC, AUX5, GND, POWERGOOD and Power Down Imminent (PDI). The AC Line-Out is 115 VAC that is typically passed to the electrical power input (not shown) of the video display terminal 11. The control unit 174 accepts the ON# input and generates the POWERGOOD output. The primary/regulation unit 172 selectively regulates the 115 VAC from the Line-In input down to ±5 VDC and ±12 VDC. Whether the primary/regulation unit 172 regulates power at the ±5 VDC and ±12 VDC lines depends on the value of ON#, as interfaced by the control unit 174. It is preferred that the control unit 174 provide isolation for the circuitry generating the ON# signal using, for example, an appropriate optoisolator.

The AC Line-In input and the AC Line-Out, ±5 VDC, ±12 VDC, GND, and POWERGOOD outputs are well known in the art. When the power supply 17 is "off," that is, not providing regulated voltages from the Line-In, the POWERGOOD signal is a logical ZERO. When the power supply 17 is "on," the power supply 17 generates the ±5 VDC and ±12 VDC regulated voltages from the 115 VAC or 220 VAC Line-In. These four regulated voltages and their associated GND are the "system power" as is commonly known in the art. When the regulated voltages attain levels within acceptable tolerances, the POWERGOOD signal changes to a logical ONE. Whenever either the +5 or +12 Volt lines fall out of tolerance, the POWERGOOD signal becomes a logical ZERO, thereby indicating this condition.

The AUX5 output provides an auxiliary +5 VDC to the planar. When the power supply 17 is plugged into a typical wall outlet supplying a nominal 115 VAC, the primary/regulation unit 172 provides regulated +5 VDC at AUX5, whether the power supply is "on" or "off." Thus, while receiving AC power from the wall outlet, the power supply 17 is always providing a nominal +5 VDC at AUX5. The AUX5 output differs from the +5 output in that the primary/regulation unit 172 only generates regulated +5 VDC through the +5 output while the power supply 17 is "on." The AUX5 output further differs from the +5 output in that the primary/regulation unit 172 supplies several amps of current at +5 VDC through the +5 output, while the primary/regulation unit 172 supplies less than an amp at +5 VDC though the AUX5 output.

Typical prior power supplies use a high-amperage double-throw switch to connect and disconnect the Line-In input to and from the regulation section of the power supply. The power supply 17 does not use a high-amperage double-throw switch. Rather, the switch 21 controls circuitry that generates the ON# signal. The switch 21 is preferably a momentary single pole, single throw pushbutton switch; however, those skilled in the art could adapt the circuitry of FIG. 7 to make use of other types of switches such as a single-pole, double throw switch. The AC Line-In is always connected to the primary/regulation unit 172 from the wall outlet. When ON# is a logical ONE (approximately AUX5, nominally +5 VDC), the primary/regulation unit 172 does not regulate the 115 VAC Line-In to ±5 VDC or ±12 VDC through the ±5 or ±12 outputs. The primary/regulation unit 172 merely provides a low-amperage nominal +5 VDC at the AUX5 output. On the other hand, when ON# is a logical ZERO (approximately GND), the primary/regulation unit 172 does regulate the 115 VAC Line-In to ±5 VDC and ±12 VDC through the four ±5 and ±12 outputs, respectively. Thus, when ON# is a ONE, the power supply 17 is "off" and when ON# is a ZERO, the power supply 17 is "on."

When system 10 is in the normal operating state 150 or the standby state 152 and an AC power disturbance occurs at the wall outlet, the AC Line-In will detect the power disturbance and the control unit 174 will activate the PDI signal (i.e., PDI will change from a first logic state (e.g., logic zero) to a second logic state (e.g., logic one)) indicating that power will no longer be supplied to system 10 after the power supply 17 backup power is exhausted. The AC power disturbance could be a brownout (power still applied but at less amplitude, e.g., 50 V instead of 110 V) or a blackout/power outage (no power supplied from the wall outlet). When the AC power disturbance occurs, the power supply 17 will switch to its internal backup energy storage which will maintain power on the ±5 VDC, ±12 VDC and AUX5 lines during the AC power disturbance to keep system 10 running while the system 10 performs the "suspend" routine thereby saving data to the hard drive prior to the power supply 17 no longer generating power to system 10 (described in more detail below). After the system 10 is suspended, all power to the system is stopped including ±5 VDC, ±12 VDC and AUX5. The power supply 17 need only have sufficient backup power to allow the system 10 to perform the "suspend" routine regardless of how long the AC power disturbance remains.

Figure 6:
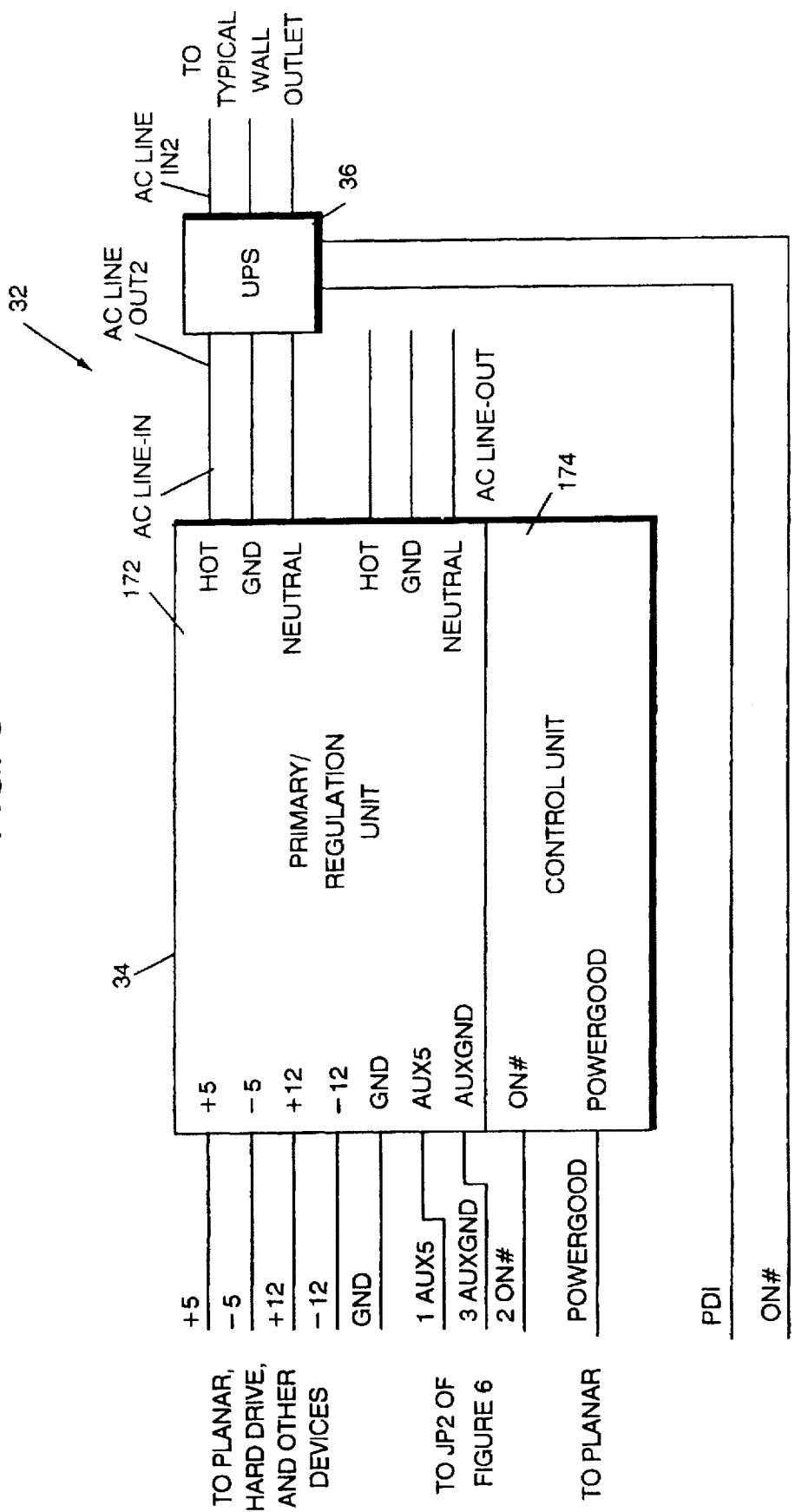
FIG. 6 is a block diagram showing the relevant portions of another power supply in accordance with the present invention.

Referring now to FIG. 6, there is shown an alternative embodiment for the power supply of system 10. (It should be noted that the description throughout this application of power supply 17 is equally applicable to power supply 32 except for the differences described below.) The power supply 32 includes a main power supply 34 and an uninterruptable power supply (UPS) 36. The power supply 34 is identical to power supply 17 except that the PDI signal is not generated therefrom and it does not include the backup storage energy. Instead the UPS 36 is used to supply the backup power and generate the PDI signal when an AC power disturbance at the wall outlet occurs. The UPS 36 has two inputs; AC Line-In2 and ON#. AC Line-In2 accepts either 115 VAC or 220 VAC from a typical wall outlet. The UPS 36 has two outputs; PDI and AC Line-Out2. The AC Line-Out2 of the UPS 36 is coupled to the AC Line In of the power supply 34 and provides 115 VAC or 220 VAC to the AC Line In of power supply 34. In addition, if an AC power disturbance occurs at the wall outlet, the UPS 36 will continue to supply 115 VAC or 220 VAC from its internal energy source to the AC Line in of power supply 34 uninterrupted by the initial AC power disturbance until the backup power storage in UPS 36 is exhausted or AC power at a predetermined level within tolerance (e.g., 115±15 V or 220±15 V) at the wall outlet returns, whichever occurs first. It should be noted that acceptable tolerance levels may vary depending on system and application requirements.

When system 10 is in the normal operating state 150 or the standby state 152 and an AC power disturbance (brownout or blackout) occurs at the wall outlet, the AC Line-In2 will detect the power disturbance and the UPS 36 will activate the PDI signal indicating that power will no longer be supplied to system 10 after the UPS 36 backup power is exhausted. The UPS 36 contains sufficient backup energy storage such that the power supply 34 can maintain power on the ±5 VDC, ±12 VDC and AUX5 lines during the AC power disturbance to keep system 10 running while the system 10 performs the "suspend" routine (described below). After the suspend routine is completed, all data will be saved to the hard drive prior to the UPS 36 no longer generating power to system 10 (described in more detail below). After the system 10 is suspended, all power to the system is stopped including ±5 VDC, ±12 VDC and AUX5. The UPS 36 need only have sufficient backup power to allow the system 10 to perform the "suspend" routine regardless of how long the AC power disturbance remains.

Referring now to FIG. 7, a schematic drawing of the electronic circuitry of the computer system 10 of the present invention is shown. The circuitry in FIG. 7 is responsible for interfacing between the switch 21, the power/feedback LED 23, the power supply 17, the video display terminal 11, and code executing on the CPU 40.

The circuitry comprises four (4) integrated circuits—U1, a first preprogrammed PAL16LV8; U2, a preprogrammed 87C750 microcontroller; U3, a 74LS05, which is well known in the art; and U4, a second preprogrammed PAL16L8 (not shown)—and the various discrete components in circuit communication as shown in FIG. 7. In general, the PALs U1 and U4 (not shown) interface between the planar I/O bus 90 of FIGS. 3A and 3B and the microcontroller U2, which interfaces to the remaining circuitry of FIG. 7, which interfaces to the switch 21, the power supply 17, the video display terminal 11, and a programmable clock synthesizer (not shown).

The circuitry of FIG. 7 further comprises the switch 21, a 16 MHz crystal Y1, sixteen resistors R1–R16, nine capacitors C1–C9, three N-type MOSFETs Q1–Q3, which are standard low-current NMOS FETs suitable for acting as a logic switch in the preferred embodiment, and six (6) 1N4148 small signal diodes CR1–CR6, all configured and connected as shown in FIG. 7. The resistors R1–R16 are ¼ Watt resistors and are of values shown in FIG. 7, ±5%. The capacitor C1 is a 10 µF (±10%) electrolytic capacitor. The capacitors C2 & C3 are 22 pF (±10%) tantalum capacitors. The capacitors C4–C8 are 0.1 µF (±10%) ceramic capacitors. Finally, the capacitor C9 is a 1000 pF (±10%) ceramic capacitor.

The crystal Y1 and the capacitors C2 and C3 generate signals used by the microcontroller U2 to control the timing of operations, as is known in the art. The diodes CR1 and CR3 and the resistor R13 isolate the AUX5 signal from the VBAT signal, while at the same time allowing the AUX5 signal to supplement the VBAT signal in that while the power supply 17 generates the AUX5 signal, the battery 171 is not drained. Rather, the AUX5 signal is stepped down through the diodes CR1 and CR3 to supply the proper voltage to the devices connected to VBAT. In the alternative, the VBAT line is isolated from the AUX5 line.

The second PAL U4 (not shown) is connected to address lines SA(1) through SA(15) and the AEN (address enable) line. SA(1) through SA(15) and AEN are part of the planar I/O bus 90 shown in FIGS. 3A and 3B. The second PAL U4 is programmed to be merely an address decoder, presenting an active low signal DCD# when a predetermined address is presented on address lines SA(1) through SA(15) and the AEN (address enable) line is active. In this particular embodiment, the second PAL U4 is preprogrammed to decode two consecutive 8-bit I/O ports at addresses 0ECH and 0EDH. In the alternative, the DCD# signal can be generated by another electronic device, such as from a memory controller's general purpose input/output port as is known to those skilled in the art.

The first PAL U1 is programmed to provide several functions: (i) a read/write interface between the CPU and the microcontroller U2 to allow commands and data to be transferred between the CPU 40 and the microcontroller U2, (ii) a logical ORing of the mouse interrupt INT12 and the keyboard interrupt INT1; and (iii) a reset output to reset the microcontroller U2 responsive to commands from the CPU 40.

The first PAL U1 makes use of two consecutive I/O ports, also herein referred to as the "power management ports." The first PAL U1 has eight inputs from the planar I/O bus 90: SD(4), SD(0), SA(0), IOW#, IOR#, RST_DRV, IRQ1, and IRQ12. The first PAL U1 is reset to a known initial condition by the active high signal RST_DRV input at pin 7(I6), which is typically generated by the memory controller 46, as is well known to those skilled in the art.

A reset line RST751 of the microcontroller U2 is at pin 9. A reset subcircuit 920 is responsible for generating the RST751 signal and comprises the four resistors R4, R14, R15, and R16, the two capacitors C1 and C8, and the two MOSFETS Q2 and Q3, in circuit communication with the first PAL U1 and the microcontroller U2 as shown in FIG. 7. The reset subcircuit 920 interfaces the reset output signal RESET from the first PAL U1 to the reset input signal RST751 of the microcontroller U2 such that when the RESET line is at a logical ONE, the RST751 line is pulled to a logical ONE, thereby resetting the microcontroller U2.

The first PAL U1 resets the microcontroller U2 responsive to the CPU 40 writing a logical ONE to bit 0 of control port 0EDH. Writing a logical ONE to bit 0 of control port 0EDH causes the first PAL U1 to pull the RESET line to a logical ONE, which pulls the RST751 line to a logical ONE, thereby resetting the microcontroller U2. The CPU 40 clears the reset request by writing a logical ZERO to bit 0 of control port 0EDH.

In addition, the reset subcircuit pulls the RST751 line to a logical ONE, thereby resetting the microcontroller U2, whenever the voltage of AUX5 signal raises by a given amount as would occur after the AUX5 voltage is reapplied. The manufacturer of the 87C750, Philips, suggests using a simple RC circuit to prevent reset problems; however, a simple RC circuit has been found to not provide a clean reset. In the particular configuration of FIG. 7, the RST751 line is pulled to a logical ONE for a period of time determined by R15 and C8 (thereby resetting the microcontroller U2) when the AUX5 voltage raises by a threshold amount in a period of time greater than the time constant determined by R4, R14, and C1. This would occur, for example, when AC power at the wall outlet returns after a typical brownout or blackout. The threshold value is approximately 1.5 VDC in the embodiment shown in FIG. 7.

The reset circuit provides the benefits of increased reset protection for the microcontroller U2, while being very inexpensive and consuming virtually no power when not resetting the microcontroller U2.

The microcontroller U2 is interfaced to the CPU 40 via the first PAL U1 and has a number of inputs, outputs, and internally controllable functions.

The SWITCH signal is input at pin 8 (P0.0) and reflects the current state of the pushbutton 21. The pushbutton 21 is normally open. While the pushbutton 21 is open, the SWITCH line is pulled to a logical ZERO (ground) through resistor R1. When the pushbutton 21 is pressed, thereby causing a closure event, the SWITCH line is pulled up to a logical ONE (AUX5) through resistor R12. Capacitor C6 acts to debounce the switch closure event; any further debouncing of closure events of the switch 21 are performed within the microcontroller U2 by reading the SWITCH a predetermined number of times, e.g. 50 times, and assuring that the SWITCH line is the same for all those reads, as is known to those skilled in the art.

The regulation of the power supply 17 (or 32) is directly controllable by the microcontroller U2. As shown in FIG. 7, the ON signal is output at pin 5 (P3.0) and is wire-ORed with the SWITCH signal via resistor R6 to control the ON# signal of the power supply. When the ON signal is a logical ONE, MOSFET Q1 conducts, thereby pulling the ON# line (pin 2 of JP2) to a logical ZERO (GND), thereby causing the power supply 17 to begin providing regulated power to the system through the ±5 VDC and ±12 VDC lines. On the other hand, when the ON line is a logical ZERO, MOSFET Q1 does not conduct, therefore the ON# line (pin 2 of JP2) is pulled to a logical ONE (AUX5) by resistor R7, thereby causing the power supply 17 to cease providing regulated power through the ±5 VDC and ±12 VDC lines.

The state of the ON line is controlled by the microcontroller U2 responsive to a closure event of the switch 21 and responsive to the CPU 40 via a writable register bit within the microcontroller U2, which can be written by the CPU 40. The microcontroller U2 is powered by AUX5; therefore, the microcontroller U2 is always powered (except after a PDI suspend is completed as described above), executing code, and controlling the system. If the power supply 17 is not providing regulated power to the system through the ±5 VDC and ±12 VDC lines and either (i) the switch 21 is pressed, (ii) one of the external events occurs or (iii) the internal alarm expires, then the microcontroller U2 asserts the ON signal, thereby causing the power supply 17 to provide regulated power to the system through the ±5 VDC and ±12 VDC lines. The microcontroller continues asserting the ON signal after the switch 21 is released.

As a backup system, the power supply 17 (or 32) can also be turned on under the direct control of the user via the pushbutton 21. This option will typically only be used if the microcontroller U2 ceases functioning as expected, as will be evidenced by the system not powering up responsive to a press of the power button 21. As shown in FIG. 7, the switch 21 also controls the ON# line of the power supply 17 via the diode CR2, the MOSFET Q1, the resistor R7, and the connector JP2. Normally the pushbutton 21 is open and the SWITCH line is pulled to a logical ZERO through R1 and MOSFET Q1 does not conduct; therefore the ON# line (pin 2 of JP2) is pulled to a logical ONE (AUX5) by resistor R7, and the power supply 17 is not providing regulated power through the ±5 VDC and ±12 VDC lines.

When the switch 21 is pressed and held by the user, the SWITCH line is pulled to a logical ONE and MOSFET Q1 conducts, thereby pulling the ON# line (pin 2 of JP2) to a logical ZERO (GND), thereby causing the power supply 17 to begin providing regulated power through the ±5 VDC and ±12 VDC lines. With the button 21 still held in, after the system is powered, the BIOS causes the CPU 40 to test whether the microcontroller U2 is still functioning. If not, the CPU 40 resets the microcontroller U2, which after being reset, detects that the switch 21 is being pressed. Consequently, with the button 21 still held, the microcontroller asserts the ON signal and the user can finally release the switch 21 with the knowledge that the microcontroller is now controlling the power supply 17. To use this backup option, the user must press the button 21 for a period of time on the order of seconds—approximately five seconds into POST.

The microcontroller U2 only turns off the system responsive to either (i) the switch 21 being pressed or (ii) the CPU 40 commanding the microcontroller to turn off the system. To the microcontroller U2, these events are the same, because the microcontroller is configured such that a switch press can be caused either by a closure event of the switch 21 or by the CPU 40; a hardware button press/release is treated virtually the same as a software button press/release. The microcontroller U2 only turns off the system without a command by the CPU if the APM connect flag in the microcontroller U2 is cleared. In this case, when the system is powered and the APM connect Flag is CLEARed, responsive to a closure event of the switch 21, the microcontroller U2 clears the ON signal, thereby causing the power supply 17 to cease providing regulated power to the system through the ±5 VDC and ±12 VDC lines. The ON signal remains cleared after the switch 21 is released.

The microcontroller U2 also turns off the system 10 responsive to a command by the CPU, as would be issued after a the system state has been successfully saved to the hard disk drive 31 (suspended). Responsive to such a command, the microcontroller U2 clears the ON signal, thereby causing the power supply 17 to cease providing regulated power to the system through the ±5 VDC and ±12 VDC lines.

In addition, for a PDI suspend, AUX5 will also be turned off. More specifically, if backup power within power supply 17 is supplying power, then when ON is cleared (after PDI suspend completed) circuitry within power supply 17 will turn off AUX 5. If UPS 36 is supplying the backup power then when PDI is active and ON is cleared, the UPS 36 will drop its AC Line-Out2 and thereby turn off AUX5 from power supply 34.

The microcontroller U2 can also detect and affect the system when certain external events occur. The EXT_RING signal is input at pin 7 (P0.1) and allows the microcontroller U2 to detect a ring from the powered external modem 902. As known to those skilled in the art, typical external modems supply a ring signal that toggles to a logical ONE in the well known RS-232C format when a ring signal is detected across the tip and ring telephone lines. This signal is interfaced to the microcontroller U2 via diode CR6 and divided with resistors R9 and R10 and finally input into the microcontroller U2 via the EXT_RING line. The toggling signal is sampled every 25 milliseconds and analyzed by the microcontroller U2, which deems that a ring is present whenever this input is a logical ONE for two consecutive samples. Responsive to this condition being met, the microcontroller U2 asserts the ON signal, thereby causing the power supply 17 to begin providing regulated power to the system through the ±5 VDC and ±12 VDC lines. For the EXT_RING signal to be used to detect an incoming telephone call, an externally powered modem 902 must be present.

In the alterative, another device that provides a binary signal conforming to the RS-232 specification (or close enough that it asserts the EXT_RING signal) can be interfaced to the EXT_RING line and used to awaken the system, for example, motion sensors, burglar alarm sensors, voice activated sensors, light sensors, infrared light sensors, "clapper" type sensors, etc.

As shown in FIGS. 3B and 7, the present embodiment also has a provision for detecting a telephone ring signal from an internal modem 900 having an optoisolator (not shown) OPTO1 based ring-detect circuit. Many suitable optoisolators are manufactured by e.g., Hewlett Packard, and widely available from numerous sources. The internal modem 900 can either be designed into the circuitry of the system planar 20 or placed into one of the expansion slots 78. In the latter case, the modem 900 must be modified to provide a Berg or similar connector to allow the signal from the optoisolator OPTO1 to be electrically connected to the circuitry of the power management circuitry of FIG. 7. The EXT_WAKEUP# signal is input at pin 4 (P0.2) of the microcontroller U2 and is used to input a signal from the ring-detect optoisolator OPTO1 from the internal modem 900. This signal is interfaced via resistors R8 and R5, diode CR6, and capacitor C9 and finally input into the microcontroller U2 via the EXT_WAKEUP# line.

The toggling signal from the optoisolator OPTO1 is detected and analyzed by the microcontroller U2, which deems that a ring is present whenever three (3) consecutive signal periods of the signal on EXT_WAKEUP have a frequency of between 15.1 Hz and 69.1 Hz. Unlike the EXT_RING signal circuit, which must be powered to provide the ring signal along EXT_RING, the internal modem 900 need not be powered for the optoisolator OPTO1 to supply a suitable signal along the EXT_WAKEUP# line, which is normally pulled up to AUX5 by R5.

The CPU 40 has a system management interrupt (SMI). The microcontroller U2 can interrupt the CPU 40 via the CPU's SMI. The system management interrupt signal SMI_OUT# is output at pin 3 (P3.2) of the microcontroller U2 and allows the microcontroller U2 to immediately interrupt the CPU 40 without waiting for the operating system to validate or otherwise allow the interrupt. SMI_OUT# may be directly connected to the CPU's SMI# pin or to an external power management interrupt (EPMI#) pin found on memory control chip 46. The signal on the EPMI# pin of the control chip 46 typically passes its state through another pin of the control chip 46 which is connected to the CPU 40 SMI# pin. In the preferred embodiment, SMI_OUT# is tied directly to the CPU 40.

The state of the SMI_OUT# line is controlled by a writable register bit, which can be written by the CPU 40, located within the microcontroller U2. In addition the microcontroller U2 can assert the SMI_OUT# signal and thereby interrupt the CPU 40 (i) responsive to activity being detected on the ACTIVITY# line, (ii) before the microcontroller U2 causes the power supply 17 to stop providing regulated power to the system, (iii) responsive to PDI being detected on the PDI line or (iv) responsive to a switch press. Any or all of these events can be enabled and disabled by commands from the CPU to the microcontroller U2.

Before entering the SMI routine, the microcode in the CPU 40 saves the state of the CPU 40 to the special CPU state save area to or from memory. Thereafter, the CPU 40 executes the SMI interrupt handler, which performs the functions below. To restore the state of the CPU, the SMI interrupt handler issues the RSM (resume) instruction, which causes the CPU 40 to restore its own state from the special save area.

Before the CPU 40 causes the microcontroller U2 to interrupt the CPU 40 via the CPU's SMI, the CPU 40 writes a value to a variable in CMOS NVRAM 96 indicating the reason for the SMI. This value in CMOS NVRAM 96 defaults to 00H, which indicates to the CPU 40 that the microcontroller U2 is interrupting the CPU 40 asynchronously, as occurs before the microcontroller U2 causes the power supply 17 to stop providing regulated power. After each SMI, the CPU 40 sets that variable in CMOS NVRAM to 00H. Responsive to this value, the CPU 40 performs certain tasks under the assumption that the system is going to be powered down imminently by the microcontroller U2. The CPU 40 can extend the period of time before which the microcontroller U2 powers down the system by periodically restarting the power down extend timer within the microcontroller U2. In summary, anytime an SMI occurs when the CPU 40 does not cause the SMI, the value in CMOS NVRAM 96 will be 00H. The SMI handler then determines the appropriate action to be taken based on what event caused the SMI.

During this period of time before the system 10 powers down, the CPU 40 can perform numerous tasks. For example, the CPU writes to the CMOS NVRAM 96 certain information that is to be written to the hard drive 31 later, such as the period of time the computer system was operating since its last power on. In addition, since the user may have changed one or more of the parameters that affect the wake alarm, the CPU recalculates and writes to the microcontroller U2 a fresh minutes to wake value.

Other values written by the CPU 40 include 01H, which indicates that the CPU 40 is to jump to the Suspend Routine at 254; 02H, which indicates that the CPU 40 is to jump to the Resume Routine at 454; and 0FFH, which indicates that the CPU 40 is to set up the special CPU state save area in the segment E000H data structure.

The microcontroller is given control over blanking the display 11. The DISP_BLANK signal is output via pin 1 (P3.4) of the microcontroller U2 and directly controls the blanking of the display 11. Two inverters U3D and U3E interface the DISP_BLANK signal with the ESYNC# and BLANK# lines. With the DISP_BLANK signal at a logical ZERO (GND) the outputs of U3D and U3E are isolated which allows the video controller 56 to generate a video signal. When DISP_BLANK is a logical ONE (Vcc), BLANK# and ESYNC# are at a logical zero (GND) and the video controller 56 ceases generating the video signal. The state of the DISP_BLANK line is controlled by a writable register bit, which can be written by the CPU 40, located within the microcontroller U2. The CPU 40 instructs the microcontroller U2 to blank the display when the system enters the standby state 152. In addition, the DISP_BLANK line is sequentially SET then CLEARed responsive to closure events of the switch 21. Similarly, activity at any one of the activity interrupts, in this case INT1 and INT12, causes the microcontroller to CLEAR the DISP_BLANK line, thereby allowing the video controller 56 to generate the video signal.

CLK_SLOW# is output at pin 2 (P3.3) of the microcontroller U2 and is used to control a clock synthesizer (not shown). The state of the CLK_SLOW# line is controlled by a writable register bit, which can be written by the CPU 40, located within the microcontroller U2. In addition, the CLK_SLOW# line can be cleared by the microcontroller U2 in response to activity at the ACTIVITY# line. It should be understood by those of ordinary skill in the art that various clock synthesizers can be used in the present invention. One such clock synthesizer is the CH9055A, which is manufactured by Chrontel, and widely available from numerous sources.

Additionally, the microcontroller U2 directly controls the illumination of the power/feedback LED 23. The LED_CNTRL signal is output at pin 22 (P3.6) and allows direct control of the power/feedback LED 23 by the microcontroller U2. The resistors R2 and R3 and diodes CR4 and CR5 allow the power/feedback LED 23 to be driven by either the AUX5 power line or the VCC power line in response to the LED_CNTRL line being at a logical ZERO. When the LED_CNTRL line is at a logical ONE, the power/feedback LED 23 is not illuminated. The state of the LED_CNTRL line is controlled by the microcontroller U2 in response to a closure event of the switch 21, in response to the wake alarm, in response to one or more rings at either ring-detect input, or in response to the system 10 being placed in the standby mode.

The microcontroller U2 can control the LED 23 to be a simple power LED. As such, the LED 23 is illuminated after a closure event of the switch 21 that causes the system to change from either the off state 156 or the suspend state 154 to the normal operating state 150. Likewise, the microcontroller U2 extinguishes the LED 23 after a release event of the switch 21 that causes the system to change from the normal operating state 150 to either the suspend state 154 or the off state 156.

In addition, the LED 23 can be selectively flashed at a particular rate, e.g., every second, by the microcontroller U2 to indicate that the system is in the standby state 152. In addition, the LED 23 can be selectively flashed at a different rate, e.g., every half-second, by the microcontroller U2 to indicate that the system was awakened by a ring or by the alarm and the system is in either the off state or the suspend state. In the alternative, while in the suspend state, the LED 23 can be selectively flashed in groups of flashes by the microcontroller U2 to indicate the number of times the system was powered up by external events, such as a ring, alarm, etc., and was powered back down by the expiration of the inactivity suspend timer. In this case, the BIOS is provided with one or more functions to allow the OS and application programs to modify the number of times the microcontroller U2 is to flash the LED 23.

The PWR_GOOD signal is input at pin 4 (P3.1) of the microcontroller U2 and allows this signal to be used by the microcontroller U2 and the CPU 40. Specifically, the microcontroller uses the PWR_GOOD signal to implement a feedback-based fault detection and correction circuit to determine if the power supply 17 has faulted and to clear the faulted condition. If the ON signal has been asserted for a period of time (e.g., three seconds) and the PWR_GOOD signal is at a logical zero, indicating that the power supply 17 is not providing regulated voltages at proper levels, then the microcontroller U2 assumes that the power supply 17 has faulted from, e.g., an overcurrent condition. Consequently, to possibly clear the faulted condition, the microcontroller U2 ceases asserting the ON signal for a period of time (e.g., five seconds) to allow the fault to clear. Thereafter, the microcontroller U2 reasserts the ON signal and waits for the PWR_GOOD signal to become a logical ONE, indicating that the power supply 17 is now providing regulated power to the system. Without this feedback-based fault detection and correction, the power supply 17 would remain faulted and the microcontroller U2 would continue to assert the ON signal in an attempt to cause the power supply 17 to begin generating regulated power. The only solution would be to remove AC power from the power supply to clear the fault.

In the present invention, the PDI control signal from the power supply 17 or the UPS 36 is tied to pin 21 (P3.7) of the microcontroller U2 via a cable or other wire. (It should be noted that this pin is a generally unused general purpose input/output (I/O) pin and any general purpose I/O pin, as found on many Super I/O chips can be used.) BIOS can then poll pin P3.7 and when PDI is active, detect the AC power disturbance. Alternatively, the microcontroller U2 can be programmed to generate an SMI when it senses PDI active to detect the AC power disturbance. After BIOS detects PDI active or the microcontroller U2 generates an SMI when it senses PDI. BIOS can then perform the suspend routine (described below with reference to FIG. 10). This feature can be enabled/disabled by the user through BIOS setup.

It should be noted that in this embodiment, the PDI signal need not necessarily be tied to a pin of the microcontroller U2, the signal just must be able to be sensed by system 10. The system BIOS (as mentioned above) or the operating system (OS) may monitor the data on this pin, and should the signal become active, a suspend to disk would be initiated. It should be noted that the Suspend Enable Flag must be set either by a user or BIOS at any time prior to the AC power disturbance.

It should be noted that the Suspend Enable Flag must be set either by a user or BIOS at any time prior to the AC power disturbance.

The ACTIVITY# signal is input at pin 19 (INT1) of the microcontroller U2 and is used by the microcontroller U2 to respond to activity at the keyboard 12 and mouse 13. IRQ1 is the keyboard hardware interrupt signal, which is input at pin 8 (I7) of the first PAL U1; pressing a key on the keyboard 12 causes the IRQ1 signal to pulse. IRQ12 is the mouse hardware interrupt signal, which is input at pin 11 (I9) of the first PAL U1; moving the mouse 13 or pressing a button on the mouse 13 causes the IRQ12 signal to pulse. The IRQL and IRQ12 signals are logically ORed in the first PAL U1 and output as the ACTIVITY# signal. Using the ACTIVITY# signal allows the microcontroller U2 to never miss activity of either the keyboard 12 or the mouse 13. Other activity (DMA access, other IRQs, etc.) sources may be easily added to IRQ1 and IRQ2 by those skilled in the art. "Green" chipsets (i.e., chipsets which are capable of entering a low power state and monitoring activity) such as the one shown in FIG. 7 can monitor activity from a variety of sources (DMAS, IRQs, I/O accesses) and their sensing may be easily integrated with the present invention by those skilled in the art.

While in the standby state, activity on either interrupt causes the microcontroller to restore immediately the video display. Using the interrupts IRQ1 and IRQ12 in this manner gives the user immediate feedback in the form of a restored video display when returning from the standby state 152 to the normal operating state 154. Without it, the user might not receive feedback until possibly seconds later when the APM checks for user activity.

Communications between the CPU 40 and the microcontroller U2 are performed using SD(0), which is input at pin 18 (I/O6) of the first PAL U1 and input to the microcontroller U2 via the RWDO line, which is output at pin 13 (I/O3) of the first PAL U1 and input at pin 13 (P1.0) of the microcontroller U2, SD(1), which is input at pin 14 (p1.1) of the microcontroller U2, SD(2), which is input at pin 15 (p1.2) of the microcontroller U2, SD(3), which is input at pin 18 (p1.3) of the microcontroller U2, SD(4), which is input at pin 6 (I5) of the first PAL U1, IO__STROBE#, which is input at pin 18 (INT0) of the microcontroller U2, and PROC_RDY, which is output at pin 20 (P1.7) of the microcontroller U2. The first PAL U1 and the microcontroller U2 are configured and programmed to provide (i) four-bit parallel writes from the CPU 40 to the microcontroller U2 along SD(0) via RWD0, SD(1), SD(2), and SD(3), with one address being essentially a one-bit write to reset the microcontroller U2 and the other being a nibble written to the microcontroller U2 that is only valid when data bit SD(4) is HIGH, and (ii) serial (one-bit) reads from the microcontroller U2 by the CPU 40 along SD(0) via RWD0, with one address corresponding to the status bit and the other corresponding to a data bit from the microcontroller U2.

Figure 8:
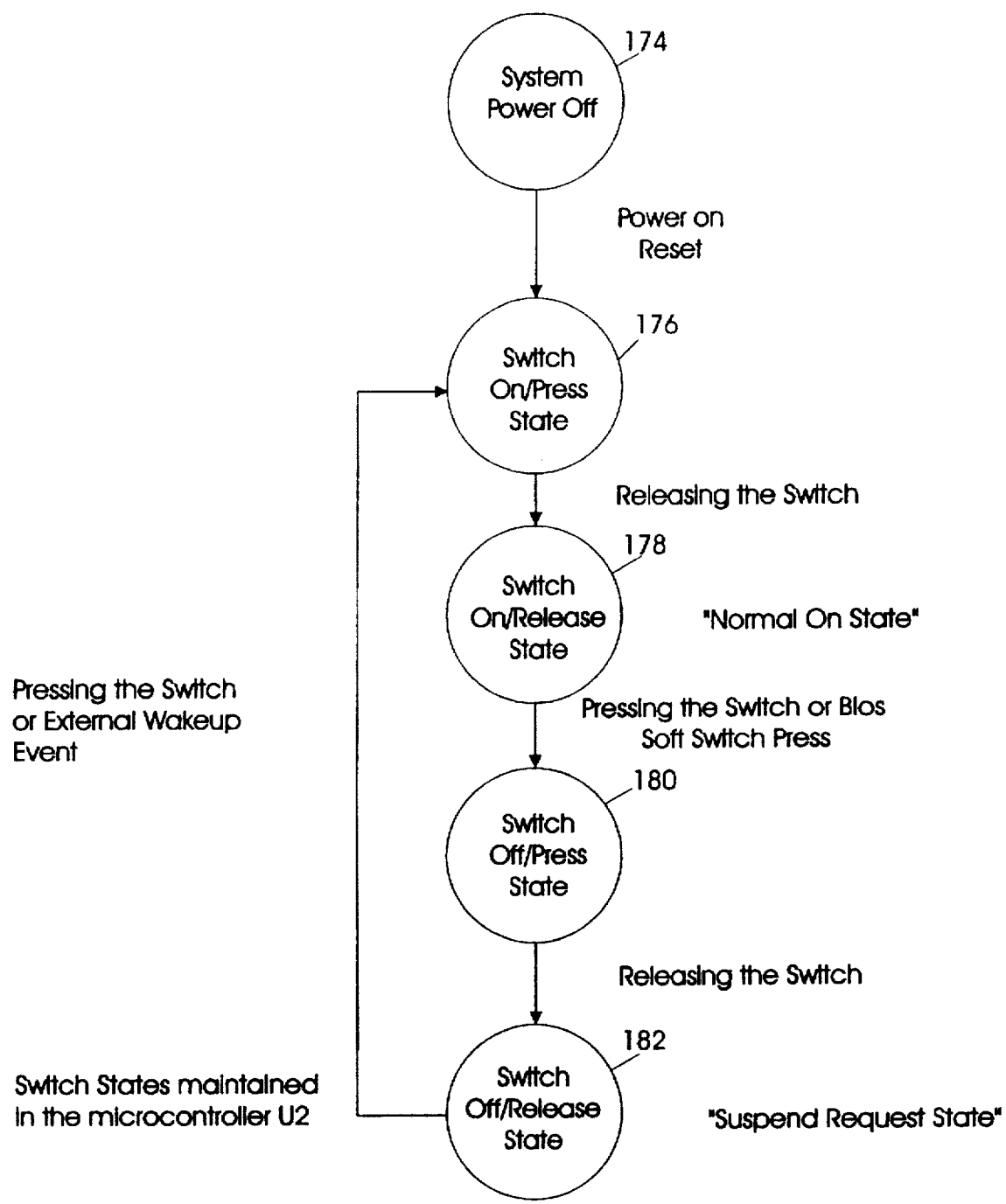
FIG. 8 is a state diagram of one of the switch states maintained by the power management processor of the present invention.
Figure 9B:
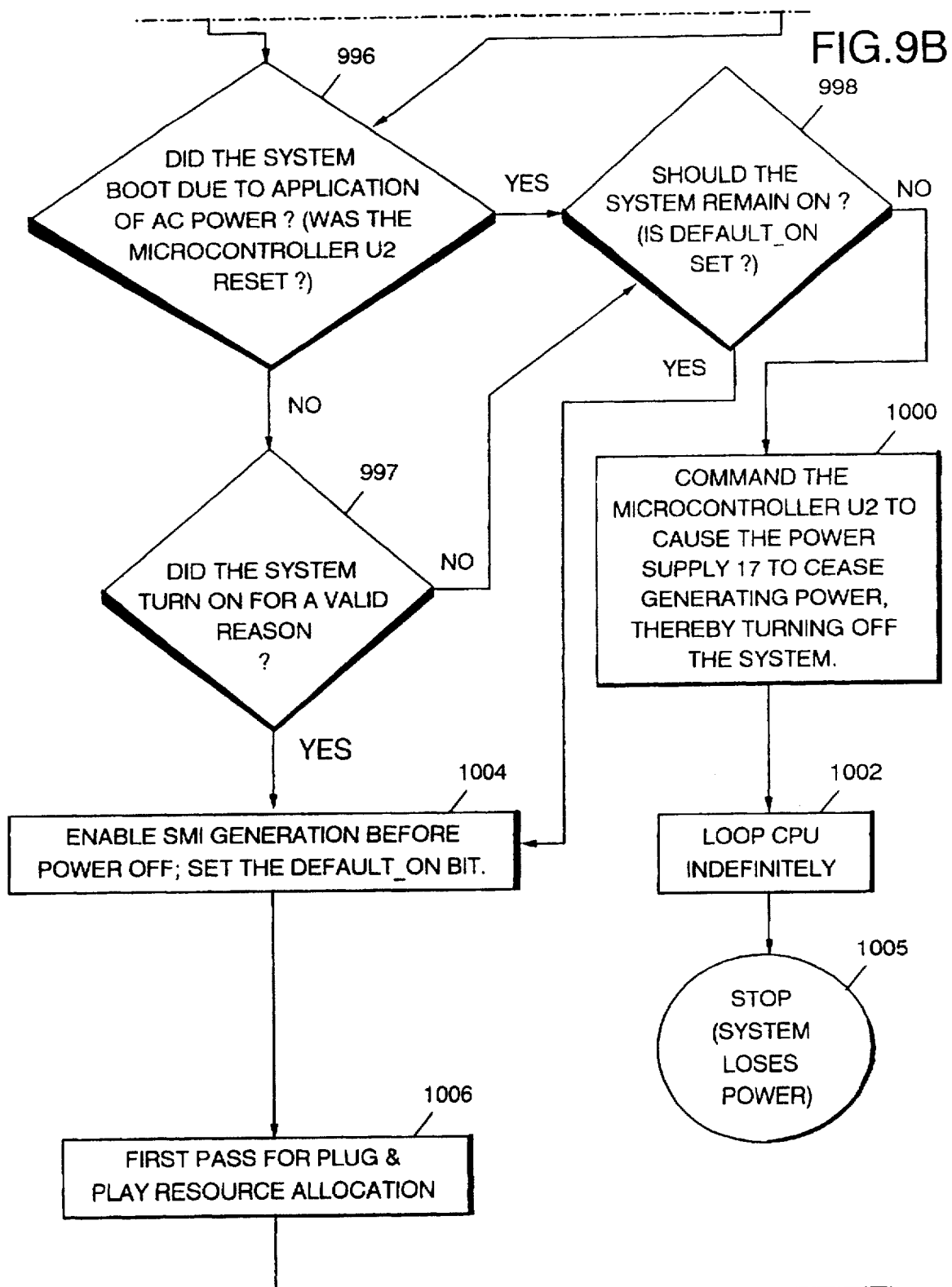
Figure 9C:
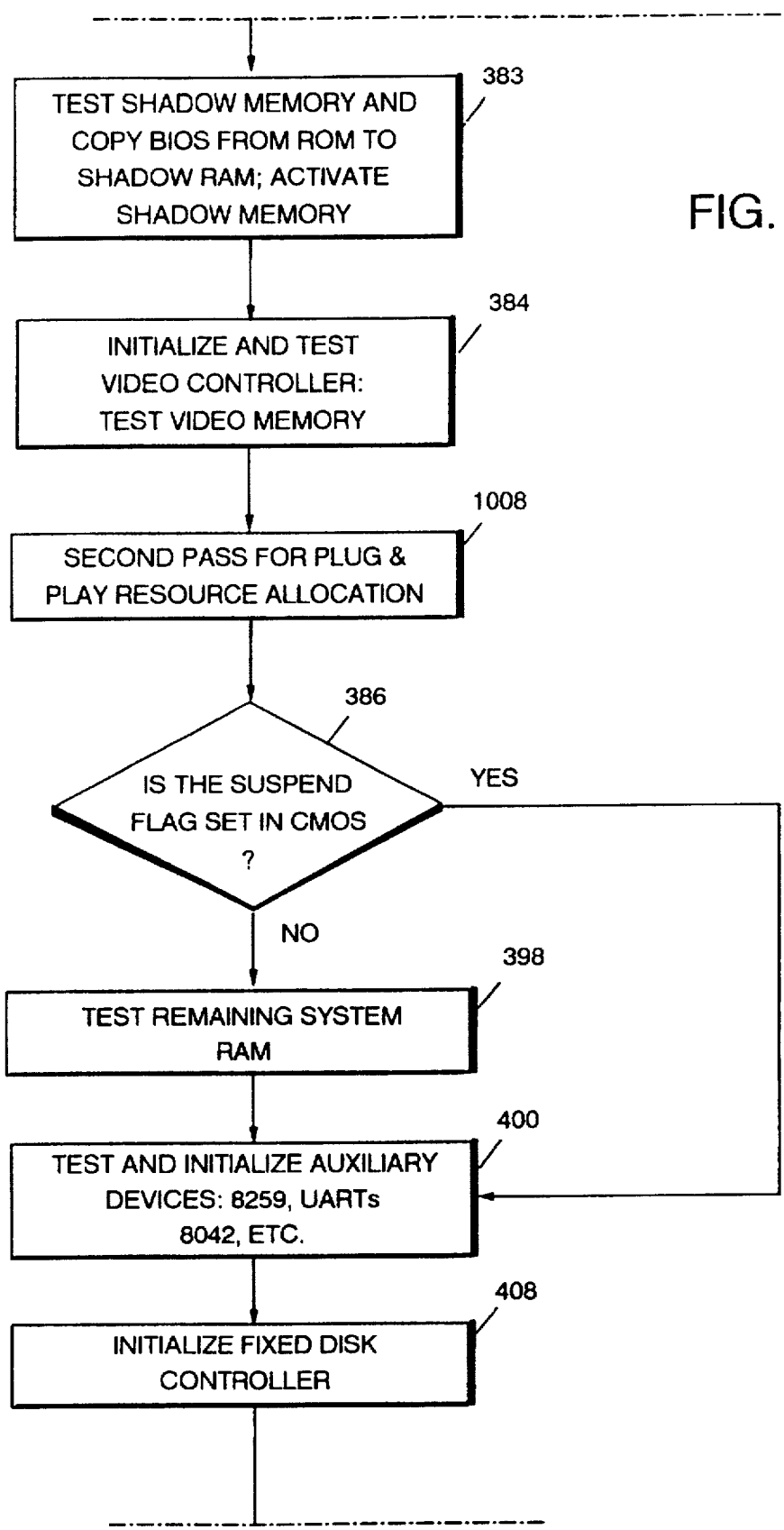
Figure 9D:
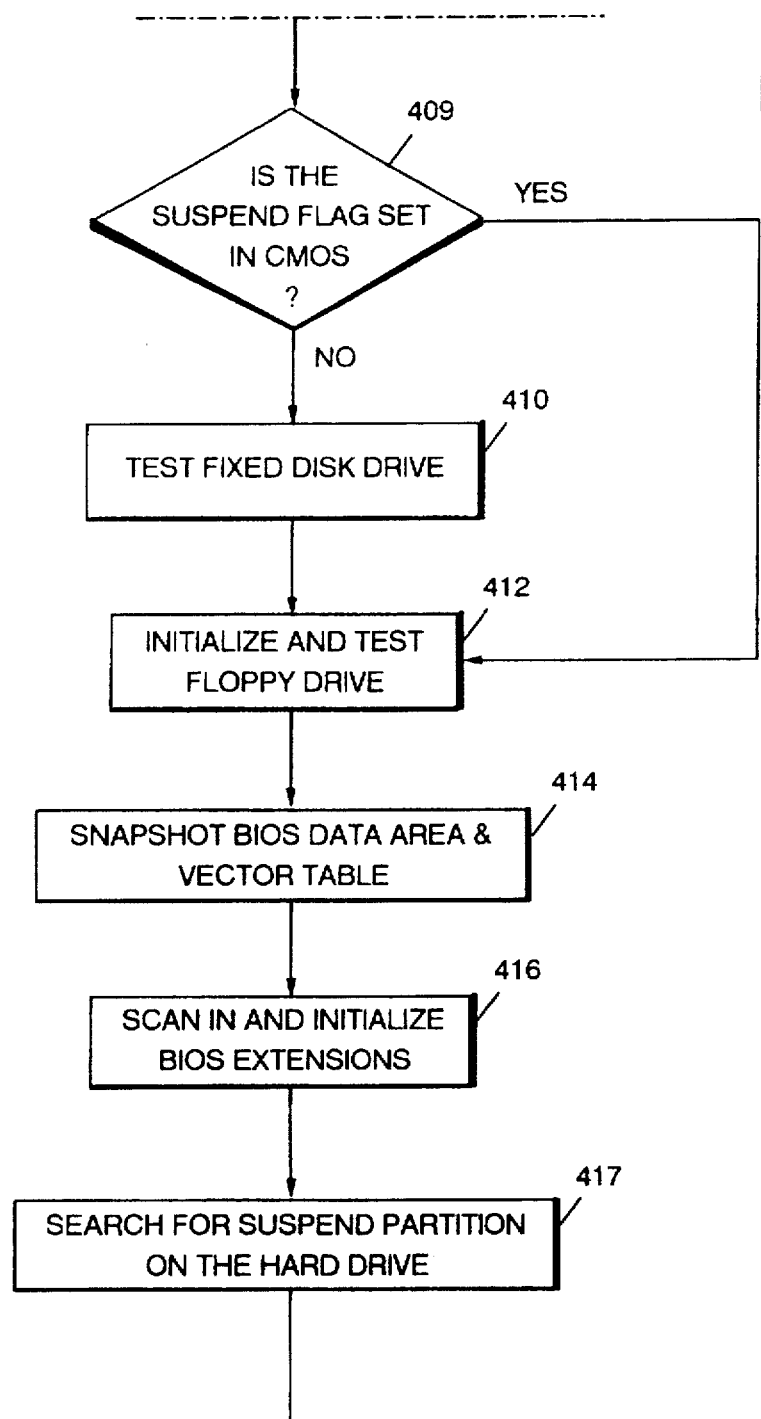
Figure 9E:
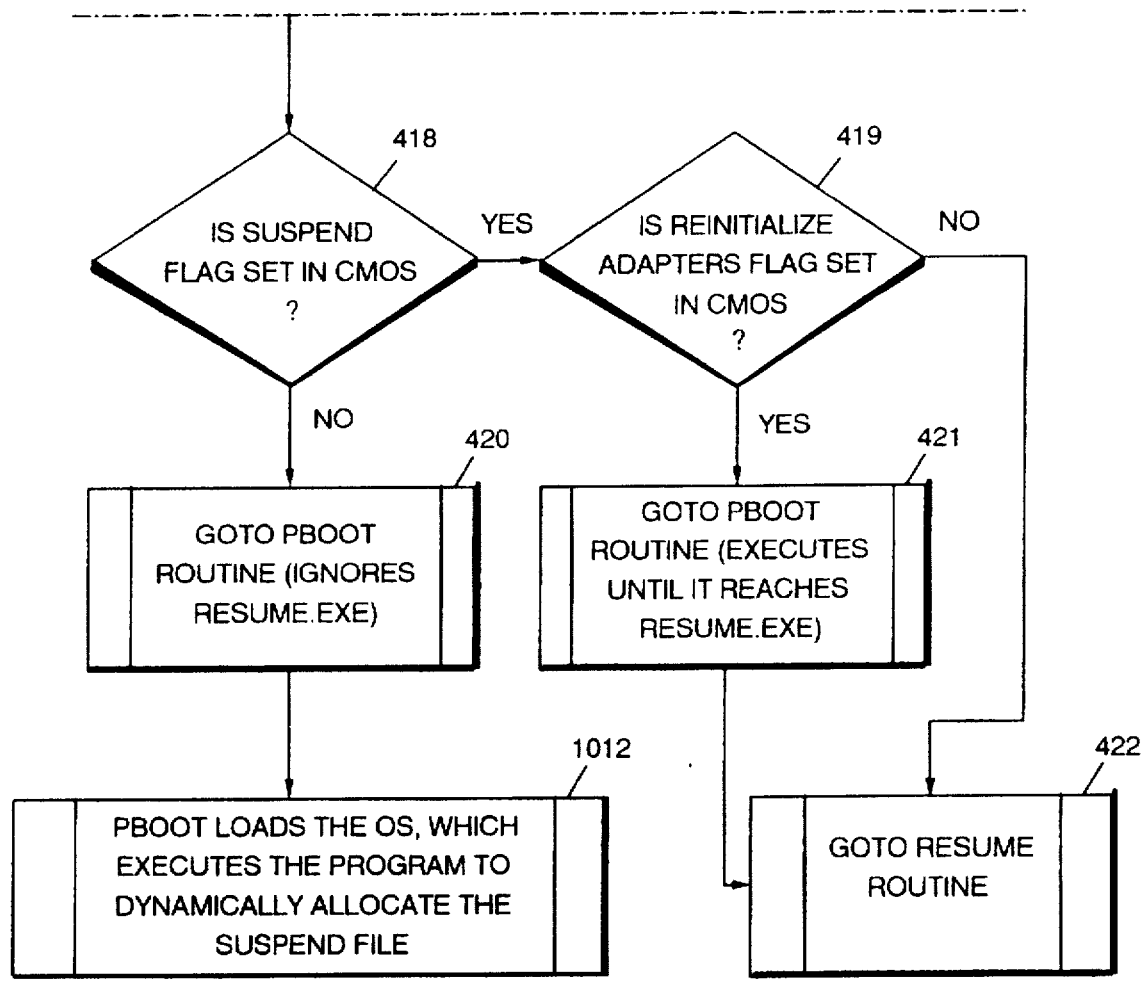

FIG. 8 shows the switch state machine maintained within the microcontroller U2. As shown therein, the states change in response to closure events of the switch 21 and other events, such as resetting the system 10 and writes by the CPU 40. With AUX5 not being provided by the power supply 17, the microcontroller U2 is not being powered and, therefore, the switch state is meaningless, at 174. Application of AC power causes AUX5 to reset the microcontroller U2 which then enters state 176. A press of switch 21, a telephone ring from either source, the minutes to alarm timer expiring, and a command from the CPU 40 cause the microcontroller U2 to cause the power supply 17 to begin providing system power, as described in the text accompanying FIG. 7.

As shown in FIG. 8, the switch 21 has four states monitored by the microcontroller U2: (i) the on/press state 176 (in which the user is holding in the button and is trying to turn on the machine), (ii) the on/release state 178 (in which the user has released the button and is trying to turn on the machine), (iii) the off/press state 180 (in which the user is holding in the button and is trying to turn off the machine), and (iv) the off/release state 182 (in which the user has released the button and is trying to turn off the machine). Next, at 180, the microcontroller U2 tests whether the switch is in the off/release state, indicating that the user has released the button and is trying to turn off the machine.

When in state 182 and the switch 21 is pressed (or an external wakeup event occurs), the microcontroller U2 enters the on/press switch state 176. Releasing the switch 21 causes the microcontroller U2 to enter the on/release switch state 178. Similarly, when the microcontroller U2 is reset, the microcontroller U2 enters the on/press state 176 and then quickly enters state 178 since the switch is released. Pressing the switch 21 again (or a BIOS soft switch press) causes the microcontroller U2 to enter the off/press switch state 180. Releasing the switch 21 again causes the microcontroller U2 to enter the off/release switch state 182. Subsequent closures of switch 21 causes the microcontroller U2 to cycle through the four states, as shown in FIG. 8.

The microcontroller U2 is in the on/release switch state 178 when the computer system 10 is in the normal operating state 150. Application programs will execute while in that state. The system 10 may enter and leave the standby state 152 in that state. This state also corresponds to a user-generated suspend abort request. The off/release switch state 182 is the switch state corresponding to a suspend request by the user. That is, starting with the system in the off state 156, pressing and releasing the switch 21 once places the computer system in the normal operating state 150. Pressing and releasing the switch 21 once again generates a suspend request, which is read by the Supervisor Routine. Pressing and releasing the switch 21 a third time, before the system 10 is in the suspend state 154, generates a suspend abort request, which is read by the Suspend Routine.

For a detailed description of the Supervisor Routine, the APM Working On Last Request Routine, the APM Reject Last Request Routine, the Resume Routine, the Save CPU State Routine, the Restore CPU State Routine, the Save 8959 State Routine, the Dynamic Save File Allocation Routine, the Exit Standby Routine, the Enter Standby Routine and the Power management Processor Routines see the above mentioned related applications.

Having described the hardware aspects of the computer system 10 of the present invention, the code aspects remain to be described.

Referring now to FIG. 9, the details of a Boot-Up Routine in accordance with the present invention are shown. The Boot-Up Routine starts at 380 when the CPU 40 jumps to and executes the code pointed to by the Reset Vector. This occurs each time the CPU is powered up and whenever the CPU is reset by either a reset hardware signal or when a RESET instruction is executed by jumping to the code pointed to by the reset vector. Such reset procedures are well known in the art.

The first task is to test the CPU 40 and initialize the memory controller 46, at 382. The CPU is tested by the POST routine. Part of the CPU test is to determine whether the CPU 40 is an "SL" enhanced part having an SMI. If so, a flag is SET indicating this fact. As mentioned above, in the preferred embodiment the CPU is an "SL" enhanced part having an SMI. The memory controller 46 is initialized by the POST routine.

Next, the Boot-Up Routine tests whether the microcontroller U2 is functioning, at 986. If the test determines that the microcontroller U2 is not functioning then the CPU 40 commands the first PAL U1 to reset the microcontroller U2, at 988, as explained above. Then the CPU 40 again checks whether the microcontroller U2 is functioning, at 990. If the CPU again determines that U2 is not functioning then the CPU 40 disables the power management features described herein, at 992, under the assumption that the microcontroller U2 is in such a state that it cannot be reset.

On the other hand, if the microcontroller U2 is functioning, then the CPU 40 continues the booting process and refreshes the minutes to wake alarm value in the microcontroller U2, at 994. The time-base of the RTC 98 is much more accurate than the time base of the microcontroller U2. Therefore, to overcome this limitation without adding a much more accurate and, therefore, expensive time base to the microcontroller U2, the BIOS synchronizes the less accurate time base to the more accurate time base and updates the minutes to wake alarm value within the microcontroller U2 with a more accurate value derived from the RTC 98 each time the system boots. To accomplish this, the CPU 40 reads the absolute alarm date and time from the CMOS memory 96, calculates the minutes to wake alarm value, and writes it to the microcontroller U2.

Thereafter, and if the microcontroller U2 is not functioning causing the power management features to be disabled, the Boot Routine determines if the system was booted due to the application of power to the power supply 17, at 996. Preferably, the power supply 17 always has AC power applied to its primary/regulation unit 172 and the regulation of power at the ±5 and ±12 lines is controlled by the ON# input. This way the power supply 17 can constantly provide the AUX5 needed to power the power management circuitry 106 and be controlled by the power management circuitry 106 without having it switch the AC power itself.

However, as is known to those skilled in the art, some users prefer to power their computer systems using a switched power strip (not shown), turning off and on the AC power to the entire system with a single switch. This poses problems for the power management circuit 106 because the microcontroller U2 and the other devices are configured to be constantly powered by the AUX5 power line. Therefore, the system must have a method of determining that it was powered by the application of AC power and behaving accordingly.

In addition, the AUX5 line is powered off after a PDI suspend is completed (described above). Therefore, the system must be able to further determine whether the microcontroller was awakened after the application of AC power after a PDI suspend. This is accomplished by BIOS setting DEFAULT_ON during a PDI suspend (described below) such that when AC power returns and thus, AUX5 returns, a reset is performed as described below.

Consequently, at 996, the CPU queries the microcontroller U2 about the event that caused the power supply 17 to be turned on. The microcontroller can return any one of four responses: (1) it was reset and, therefore, caused the power supply 17 to begin providing regulated power at the ±5 and ±12 lines, (2) the minutes to wake alarm expired, (3) a ring occurred at either the RS-232 ring input or the ring input from the optoisolator OPTO1, and/or (4) the switch 21 was pressed. The reason for the system being powered on can be read directly from the microcontroller U2 by application programs, such as a scheduler, which would execute certain programs responsive to the particular reason the system was powered up. In the alternative, the reason for powering up the system can be made available via one or more BIOS calls.

Other than being reset by the CPU 40, the microcontroller U2 is only reset by the reset subcircuit 920, which resets the microcontroller whenever either the AUX5 line is applied or it glitches. Therefore, if the microcontroller U2 was reset, or if the microcontroller returned an invalid wakeup code, which is tested at 997, the CPU 40 must then determine whether the power supply should continue the regulation of power at the ±5 and ±12 lines or not, at 998. To this end, a flag in CMOS NVRAM called DEFAULT_ON is used. If this flag is SET, then the power supply 17 should continue providing regulated power after the microcontroller U2 is reset. On the other hand, if DEFAULT_ON is not SET, then the power supply 17 should cease providing regulated power after the microcontroller U2 is reset and, therefore, the CPU 40 commands the microcontroller U2 to cause the power supply 17 to cease providing regulated power at the ±5 and ±12 lines, at 1000. Thereafter, the voltages take several seconds to ramp down to approximately zero, giving the CPU 40 time to execute numerous commands. Therefore, the CPU 40 executes an endless loop (a "spin"), at 1002, as it waits for the system power voltages generated by the power supply 17 to decline until the CPU 40 stops functioning, at 1005. As mentioned above, the microcontroller U2 is preferably constantly powered by the AUX5 line and continues executing its programmed routines.

Thereafter, if the microcontroller returned a valid wakeup code, at 997, or if the microcontroller U2 was reset, but the system, is to remain powered, at 998, the CPU 40 commands the microcontroller U2, at 1004, to generate an SMI back to the CPU 40 before it causes the power supply 17 to cease providing regulated power at the ±5 and ±12 lines in the event the microcontroller U2 deems that the power should be turned off. Also, at 1004, the CPU SETs the DEFAULT_ON bit in the CMOS NVRAM so that if AC power is lost, the system will turn itself back on after AC power is reapplied.

Then, the Boot Routine performs the first Plug & Play resource allocation pass, at 1006, as known to those skilled in the art.

Next, at 383, the shadow memory is tested and the BIOS is copied from ROM 88 to the shadow memory portion of RAM 53. The flow of the executed code depends on whether the Suspend Flag is SET in CMOS NVRAM 96. If the Suspend Flag is SET, then the computer system 10 is in the suspend state 150, and the computer system 10 should be restored to the state it was in when it was suspended. The system RAM 53 in segments E000H and F000H are given an abbreviated test. To reduce the amount of time the computer takes to resume, the memory is merely checked for proper size and zeroed (00OH is written to each location).

On the other hand, if the Suspend Flag is CLEARed in CMOS NVRAM 96, then the system RAM 53 in segments E000H and F000H are given the standard, in-depth memory test comprising: (1) a sticky-bit test, (2) a double-bit memory test, and (3) a crossed address line test. These tests are well-known in the art.

After segments E000H and F000H are tested, the BIOS may be shadowed which involves copying the contents of the ROM BIOS 88 to the system RAM 53 and configuring the memory controller to execute the BIOS from RAM. Shadowing the BIOS is done to increase the speed of the system; system performance is enhanced because the BIOS is running from the faster system RAM 53 (a typical access time is 80 nanoseconds) rather than the slower ROM 88 (typical access time 250 nanoseconds). Shadowing the BIOS comprises loading a BIOS copier to an address in lower memory, copying the BIOS from the ROM 88 to the segments E000H and F000H of the system RAM 53, and enabling the shadow RAM.

Next the video controller 56 is tested and initialized and the video memory 58 is tested, both at 384. These tests and initializations are well known in the art.

Then, the Boot Routine performs the second Plug & Play resource allocation pass, at 1008, as known to those skilled in the art.

The flow of the executed code depends on whether the Suspend Flag is SET in CMOS NVRAM 96, at 386. If the Suspend Flag is SET, then the remaining system RAM 53 is merely checked for size and then zeroed, like task 383. If, however, the Suspend Flag is CLEARed in CMOS NVRAM 96, then the remaining system RAM 53 is tested at task 398 using the three-step, in-depth memory test described in the text accompanying task 383.

After the memory is tested, the auxiliary devices— including the 8259, the UARTs, the 8042, and any others— are tested and initialized, at 400. At task 408, the fixed disk controller is initialized.

The flow of the executed code depends on whether the Suspend Flag is SET in NVRAM 96, at 409. If the Suspend Flag is SET, indicating that the state of the system was successfully saved when power was last removed, then the Boot-Up Routine skips the test of the hard drive controller 86 and hard drive 31. On the other hand, if the Suspend Flag is CLEARed in CMOS NVRAM 96, indicating that the state of the system was not saved when power was last removed, then the Boot-Up Routine performs a complete test of the fixed disk controller 86 and hard drive 31, at task 410, as is well known in the art.

Next, the floppy drive controller 84 is tested and initialized at 412.

At this time, all the devices are initialized and the vectors point to known locations, so all interrupt routines will work as expected. Therefore, the Boot-Up Routine snapshots the BIOS Data Area & Vector Table, at 414, which writes a copy of the BIOS Data Area and the Vector Table to the data structure in segment E000H. This copy of the BIOS Data Area and the Vector Table is used by the Suspend Routine at task 274 to place the computer system 10 into a known state, with all interrupts working as expected.

Next, any BIOS extensions are "scanned in" and initialized at 416 as is well known in the art. BIOS extensions are blocks of BIOS code added to the system by peripheral adapters, such as network adapters. BIOS extensions are typically located in segments C000H and D000H on the ISA bus 76 and have an associated "signature" to identify the BIOS extension as such. If a BIOS extension is detected, the length is checked and a checksum is calculated and checked. If the signature, length, and checksum all indicate that a valid BIOS extension exists, program control passes to the instruction located three bytes past the signature and the BIOS extension can perform any needed tasks such as the initialization of the peripheral adapter. Once the extension finishes execution, control passes back to the Boot-Up Routine, which searches for more BIOS extensions. Any more BIOS extensions are handled like the BIOS extension above. If no more BIOS extensions are detected, the Boot-Up Routine then moves to task 417.

At 417 the Boot-Up Routine searches for a partition on the hard drive 31 that appears to be partition specifically allocated for the Suspend File. If a partition with a PS/1 identifier "FE" or a hibernation partition with the identifier "84" in the partition table is found and that partition is large enough to accommodate a Suspend File for this particular system, then that partition is used for the Suspend File. Consequently, the Suspend File Signature is written to the first bytes of the area, and the starting head, sector, and cylinder of the area are written to CMOS NVRAM 96.

The flow of the executed code then branches, depending on whether the Suspend Flag is SET in CMOS NVRAM 96, at 418. If the Suspend Flag is cleared, then the Boot-Up Routine passes control to the PBOOT routine at 420. PBOOT is well known in the art and is responsible for loading the operating system (OS) and command interpreter from either a floppy disk or the hard drive 31. If a partition for the Suspend File was not found at task 417, then the OS executes an OS-specific driver that checks whether a partition was found, and if not allocates a file of contiguous sectors (defragmenting an area if necessary) in the file allocation table (FAT), writes the signature to the first bytes of the Suspend File, and writes the starting head, sector, and cylinder of the Suspend File to the CMOS NVRAM 96.

Regardless of when the Suspend File is allocated, the file should be contiguous sectors to allow a rapid write to disk and a rapid read from disk during suspends and resumes, respectively.

The OS next configures the system based on the instructions found in the CONFIG.SYS file. Lastly, the OS executes the AUTOEXEC.BAT file, which eventually passes execution control back to the operating system. If the Suspend Flag is cleared in CMOS NVRAM 96, indicating that the state of the system was not saved when power was last removed, then RESUME.EXE, which is explained more fully in the text accompanying task 421, is ignored.

Referring back to task 418, if the Suspend Flag is set in CMOS NVRAM 96, indicating that the state of the system was saved when power was last removed, then the flow of the executed code then branches, depending on whether the Reinitialize Adapters Flag is SET in CMOS NVRAM 96, at 419. If the Reinitialize Adapters Flag is set, then the Boot-Up Routine passes control to the PBOOT routine at 421. Like the usual PBOOT Routine, PBOOT of the present invention loads the OS, which configures the system in accordance with the commands found in the CONFIG.SYS and AUTOEXEC.BAT files, which, inter alia, load drivers and configure the system as is well known in the art.

The commands in CONFIG.SYS and AUTOEXEC.BAT may initialize adapter cards in the system. This application presumes three types of adapter cards exist: Type I adapters do not need initialization; Type II adapters require initializing, but are placed into a known working state by the BIOS extension or the driver loaded as per the CONFIG.SYS or AUTOEXEC.BAT files; and Type III adapters are modified by code executing on the system. Systems comprising Type I and Type II adapters may be suspended and restored; however, systems comprising Type III adapters, which include many networking adapters, may not be restored, unless the cards have an associated APM aware device driver that reinitializes the adapter after certain conditions occur, such as system power being removed. Systems may suspend Type III cards that have an APM aware device driver.

The file RESUME.EXE is added to the AUTOEXEC.BAT file and is responsible for transferring program control from the OS to the Resume Routine. The OS in task 420 ignores the presence of RESUME.EXE; however, the OS of task 421 executes RESUME.EXE, which passes control to the Resume Routine after the Type II adapters are finished being initialized by the device drivers loaded by the OS from CONFIG.SYS AND AUTOEXEC.BAT.

Referring back to task 419, if the Reinitialize Adapters Flag is cleared in CMOS 96, the OS passes execution control to the Resume Routine via RESUME.EXE. The Resume Routine restores the system state from the Suspend File on the hard drive.

Turning now to FIG. 10, there is shown a Suspend Routine in accordance with the present invention. The Suspend Routine essentially causes the system 10 to leave the normal operating state 150 (or the standby state 152) and enter the suspend state 154 and may return control to the Supervisor Routine after several instructions (if the system is not ready to be suspended) or several minutes, hours, days, weeks, or years later (if the system is suspended and resumed). The Suspend Routine always SETs the "Normal Resume" APM Return Code, whether the Suspend Routine returns without suspending, or returns after a complete suspend and resume.

The Suspend Routine shown in FIG. 10 commences at 250. The Suspend Routine is called by the APM in response to the Supervisor Routine returning to the APM a "Suspend Request" APM Return Code. In addition, the Suspend Routine is called and partially executed when the system performs a Checkpoint. First, the flow of the Suspend Routine depends on whether the CPU 40 is an S part having an SMI, at 970. As mentioned above, in the preferred embodiment the CPU is an "SL" enhanced part. Since the CPU 40 is an "SL" enhanced part having an SMI, the CPU 40 causes the microcontroller U2 to generate an SMI back to the CPU 40, at 972. Responsive to the SMI, microcode in the CPU 40 saves the state of the CPU 40 registers, as is known to those skilled in the art, to the segment E000H data structure, at 974 and the CPU 40 is now in Real Mode.

If the CPU 40 was not an "SL" enhanced part with an SMI, the Save CPU State Routine would be called at 252. The Save CPU State Routine is detailed in the abovementioned applications. Suffice it to say that no matter what mode the CPU 40 is in when the Suspend Routine is originally called, the remainder of the Suspend Routine will be executed with the CPU 40 in Real Mode.

After the Save CPU State Routine returns of after the CPU saves its own state responsive to an SMI, the Suspend Routine next ascertains whether the switch 21 was pressed, at 254. The switch 21 closure is tested as described in the text accompanying FIGS. 7 and 8. If the switch was not pressed, then the suspend underway is a software-suspend and the Software Suspend Flag is SET in CMOS NVRAM 96. This ensures that a software suspend is not confused with a hardware suspend initiated by a switch closure. All software suspends are converted to hardware suspends by setting a bit in the microcontroller U2. The next switch closure after converting the software suspend to a hardware suspend aborts the suspend.

The next task is to set up a stack in segment E000H, indicated at 262.

After the stack is set up the Suspend Routine, at 264, examines the DMA controller 72, the diskette adapter 84, and the IDE disk controller 86 to see if any DMA transfers, floppy drive transfers, or hardfile transfers, respectively, are currently underway. If so, the suspend cannot be done because characteristics peculiar to these three types of transfers prevent a satisfactory suspend from being performed. Thus, if any of these three types of transfers are underway, the suspend is postponed until the next APM Get Event, when the DMA and diskette controllers are tested for activity once more.

Consequently, the tasks performed at 252, 260, and 262 must be reversed so control can be passed back to the APM. First, the BIOS is changed from read/write to read-only, as shown at 265. That is accomplished by closing segment E000H, which still contains the shadowed data. The stack that was created in task 262 is popped and restored. Finally, the CPU state is restored by the Restore CPU State Routine, at 266, before control is passed back to the APM at 267. The Suspend Routine will be polled again by the APM in approximately another second during the next Get Event. By that time, the transfer(s) that prevented the suspend process will probably be complete, allowing the suspend to continue.

Returning now to task 264, if no DMA transfers, floppy drive transfers, or hardfile transfers are currently underway, then a suspend may be performed. The Suspend Routine continues at 268. Recall that the Failsafe Timer is continually counting down and will cause the system to turn itself off if it expires while the switch 21 is in the off/release state. Therefore, a first task is to reset the Failsafe Timer, described in the text accompanying FIG. 7, as shown at 268.

Next, the state of the 8042 coprocessor 104 is saved, at 270. The 8042 coprocessor 104 registers are well known in the art. The registers are directly readable by the CPU 40 and their values are written directly into the data structure in E000H.

Next, the state of the 8259 interrupt controller 92 is saved, at 272. The Suspend Routine calls the 8259 Save State Routine, which is detailed in the above-mentioned related applications. Suffice it to say that the 8259 Save State Routine ascertains the contents of the unknown registers of the two 8259 interrupt controllers 92, even though some of the registers are write-only. The register values are written directly to the data structure in E000H.

After the state of the interrupt controller 92 is saved, the configuration of the interrupt controller 92 must be changed to a known state to allow proper functioning of the various interrupt-driven tasks executed by the Suspend Routine. Therefore, the BIOS Data Areas & Vector Tables are swapped, at 274. The Suspend Routine copies the contents of the present-state BIOS Data Area and Vector Table in segment 0000H to a location in segment E000H. Next, the contents of the known-state BIOS Data Area and Vector Table are copied from the data structure in segment E000H to the location in segment 0000H. The known-state BIOS Data Area and Vector Table is copied to segment E000H in task 414 of the Boot-Up Routine, shown in FIG. 9, discussed above. Finally the present-state BIOS Data Area and Vector Table are copied from segment 0000H to the data structure in segment E000H. When the routine at 274 is finished, all the interrupts, such as interrupt 13H (disk read/write) and interrupt 10H (video access), will function as expected.

Next, the state of the timers 102 and the IDE disk controller 86 are saved, at 276. The timers' and the IDE disk controller's registers are well known in the art. All of the registers are directly readable by the CPU 40 and their values are written directly into the data structure in E000H.

The next step is to prepare the system memory to be written to the Suspend File on the hard drive 31. The system memory comprises system RAM 53 (which includes both main memory and any extended memory) and the video memory 58. At this time, parts of the RAM 53 may be in the external cache 60. The CPU cache was flushed during the Save CPU State Routine. Next, the external cache is flushed, at 286, and enabled to speed writes to the hard drive 31.

The code executing on the system 10 may have put the IDE controller 86 into an unknown state. Consequently, the next step is to initialize the IDE controller 86 to a known state, at 292. This is accomplished by writing values directly to the registers within the IDE controller 86.

Next, an interrupt-driven parallel thread to read and save the state of any modems to the E000H data structure is started, at 976. The routine captures the interrupt corresponding to the COMM port associated with the particular modem, transmits commands to the modem to cause it to sequentially transmit back the contents of its registers, receives the register contents transmissions from the modem, and saves the register values to the E000H data structure. This routine transmits a first command to the modem, and then responds in an interrupt-driven fashion, receiving the modem's response and transmitting the next command to the modem responsive to each COMM port interrupt, until all the modem's registers have been saved. If not executed as a parallel thread, this routine could add several seconds (3–5 seconds per modem depending on the particular modem and the current baud rate) to the time it takes to suspend the system. Being an interrupt-driven parallel thread, it adds little or no time to the suspend if it completes execution before the system state is written to the hard drive 31.

After the interrupt driven parallel thread modem save routine is started, the Suspend File must be located on the fixed disk within the hard drive 31, at 294. The head, sector, and cylinder of the Suspend File is stored in CMOS memory 96. Once the Suspend File is located, the file size and signature are read. The signature is preferably an ASCII code of arbitrary length that indicates the presence of the Suspend File. Other alternative implementations of the signature are possible, such as using binary strings with very low probability of being found randomly on a hard file system.

Having read the file size and signature for the Suspend File, the next step is to ensure that the signature and file size are correct, at 296. If either the signature is incorrect, indicating that another program may have modified the Suspend File, or the file size is not correct, indicating that the Suspend File size was modified, then the Suspend Routine calls the Fatal Suspend Error Routine, at 298. If the user presses the switch 17, to exit the Fatal Suspend Error Routine, program control jumps from task 299 to task 506.

On the other hand, if the signature is correct and the Suspend File is large enough, then the Suspend Routine may proceed writing the state of the computer system to memory.

Before writing the state of the computer system 10 to the hard drive 31, the CPU 40 commands the microcontroller U2 to restart (reset) the failsafe timer and queries the microcontroller U2 to determine if the switch 21 was pressed again, at 297. If the switch 21 was not pressed again then the suspend should continue. On the other hand, if the switch 21 was pressed again then the suspend is aborted. The failsafe timer is restarted and the switch 21 is tested for closure at several points in the Suspend Routine. Task 297 is merely illustrative; a circuit designer of ordinary skill in the applicable art will be able to determine the number of and permissible time between restarts of the failsafe timer. The Suspend Routine should reset the failsafe timer, before it expires causing the microcontroller U2 to cause the power supply 17 to be turned "off." Likewise, the switch 21 should be checked occasionally. If the switch 21 was pressed again, indicating that the user desires to abort the suspend, then the code should jump to an appropriate point in the Resume Routine to "un-suspend" and recover from the partial suspend.

Similarly, a Ctrl-Alt-Del aborts the suspend, at 350. Pressing Ctrl-Alt-Delete (pressing the Control key, the Alt key, and the Delete key simultaneously) is a well known method of resetting typical computer systems based on the IBM BIOS and Intel 80X86 family of CPUs. The computer system 10 handles a Ctrl-Alt-Del with a BIOS Interrupt 1 handler, as is well known in the art. The computer system 10 has a slightly modified Interrupt 1 handler, at 350, which clears the Suspend Flag in CMOS memory 96, at 352, and jumps to the Boot-Up Routine on reset, at 354.

In the computer system 10 of the present invention, pressing Ctrl-Alt-Del while the Suspend Routine is executing causes the system 10 to enter the off state 156. This happens because after the switch 21 closure, pressing Ctrl-Alt-Del causes the Boot-Up Routine to be called, and the Boot-Up Routine initializes the microcontroller U2 to a state in which the failsafe timer has expired and the switch is still in the off/release state. Thus, pressing Ctrl-Alt-Del while in the Suspend Routine causes the computer system 10 to enter the off state 156.

Referring now to task 300, the Suspend File is again located on the hard drive 31; the signature phrase is written to the first bytes of the Suspend File, at 300. Next, the entire 64 kilobytes of data in segment E000H is written to the Suspend File, at 302. This 64K copy of E000H is really just a place holder and will be rewritten to this same location at the end of the Suspend Routine.

Then, the state of the video controller 56 is saved, at 303. The video controller 56 registers are well known in the art. All of the registers are directly readable by the CPU 40 and their values are written directly into the data structure in E000H.

Next, the system memory is written to the Suspend File. This is accomplished by a twin-buffer system that reads data from system memory, compresses and writes it to segment E000H, and finally writes the compressed data from segment E000H to the Suspend File. Two routines work in a time-multiplexed arrangement: one compresses the data and writes to segment E000H, the other writes to the Suspend File. The former is running in the foreground, the latter is an interrupt-driven routine that runs in the background. Obviously, since there is only one CPU 40, only one routine can execute at a given time; however, because the latter routine is interrupt-driven, it can interrupt the execution of the former routine as needed to optimize the speed of transfer of the data to the Suspend File. Each of the two buffers is 8 kilobytes long, which is believed to optimize transfer time to the hard drive 31.

This process starts at 304 with the reading, compression, and writing to segment E000H of enough data to fill the first of the 8K buffers. The data is compressed using the run length encoding method; however, any suitable compression method may be used. At this time, the Write from Buffer Routine, which is generally indicated at 307, is started, at 306. The Write from Buffer Routine 307 is an interrupt-driven routine that runs in the background and is comprised of tasks 308–310. The Compression Routine, generally indicated at 311, comprises tasks 312–318 and is the foreground routine. First, the Write from Buffer Routine 307 writes the buffer just filled by task 304 to the Suspend File, at 308. While the Write from Buffer Routine 307 writes the contents of that buffer to the Suspend File, the Compression Routine 311 continues reading the next bytes from system memory, compressing them, and writing the compressed data to the other of the two 8K buffers, at 312. Once the Compression Routine 311 has filled the buffer with compressed data, the next step is to determine if the entire system memory has been compressed yet, at 314.

The IDE controller 86 cannot write data to the hard drive 31 very quickly. As a consequence, the Compression Routine 311 will always finish filling the 8K buffer not being written to the hard drive 31 before the Write from Buffer Routine 307 finishes writing the buffer to the hard drive 31. Therefore, the Compression Routine 311 must wait for the Write from Buffer Routine 307 to finish writing the buffer to the hard drive 31. If the Compression Routine 311 has not finished compressing and writing all of system memory, then the Compression Routine 311 waits for the Write from Buffer Routine 307, at 316. The Compression Routine 311 and the Write from Buffer Routine 307 communicate via a set of flags. When the Write to Buffer Routine 307 finishes writing the current buffer to the Suspend File, the Routine 307 next switches the buffer flags, indicating to the Compression Routine 311 that it may start filling with compressed data the buffer that was just written to the Suspend File. Next, the failsafe timer C2 is reset and the switch 21 is checked for a closure event, at 309, in the manner explained in the text accompanying task 297.

The Write to Buffer Routine 307 then decides if the buffer just written to the Suspend File is the last buffer to be written, at 310. If not, the Write from Buffer Routine writes to the Suspend File the buffer that was just filled by the Compression Routine 311. In the mean time, the Compression Routine 311, by examining the buffer flags, determined that a buffer is ready for more compressed system memory. That is, the Compression Routine waits at 316 until the Write from Buffer Routine finishes with the current buffer, at which time the compression loop continues at 312. Note, the video memory 58 is compressed if linear frame buffering is supported, but is not compressed for VESA page access. Rather, VESA page access video memory is read through the video controller 56 using VESA calls and is written without compression using the twin-buffer system, explained in more detail above.

Once the Compression Routine 311 is finished compressing all the system memory, it waits at 318 for the Write from Buffer Routine 307 to finish writing the last buffer to the Suspend File. Once the Write from Buffer Routine 307 is finished, it branches from 310 to 318 and ceases to exist. At this time, no background routines are executing and the main program continues at 320.

Next, at task 320, the state of the DMA unit 71 (DMA controller 72 and Central Arbiter 82), the 82077 diskette controller 84, and the RS-232 UARTs 94 are saved. These devices have registers that are well known in the art. All of the registers within the diskette controller 84 and the UARTs 94 are directly readable by the CPU 40 and their values are written directly into the data structure in E000H. The DMA unit does not have all readable registers. Rather, the write-only registers are normally set up before each DMA transfer. For this reason, the Suspend Routine stops a suspend if a DMA transfer is underway.

Next, at 978 the Suspend Routine tests whether the interrupt-driven modem state routine described in the text accompanying task 976 is finished. If not, it waits for this routine to finish.

It is believed to be desirable to be able to detect any tampering with the Suspend File once the computer system 10 enters the suspend state 150. For example, it may be possible for someone to generate a modified Suspend File, move that Suspend File to the hard drive 31, and attempt to have the computer system 10 restore into a different state than the one saved. To this end, a pseudo-random value is placed in the segment E000H data structure. As shown at 328, after the interrupt-driven modem state save routine is finished, a 16-bit time-stamp is read from one of the high-speed timers 102. This time-stamp is then written to the segment E000H data structure.

Next, a 16-bit checksum for the entire E000H segment is calculated by adding each 16-bit word in E000H together without ever considering the carry bit. This checksum is written to the segment E000H data segment, at 330, and is written to the NVRAM 96, at 332. After which, all the working variables are written from the CPU 40 to the segment E000H data structure, at 334, and the entire segment E000H is rewritten to the Suspend File, starting after the signature phrase of the Suspend File (directly after the signature), at 336. Next, the Suspend Flag is SET in the NVRAM 96, at 338, informing the system 10 that the state of the computer system 10 was saved to the Suspend File.

Next, the Suspend Routine determines whether a Checkpoint is being taken, at 980. If so, then the system should not be powered down; rather, the system must be resumed to the extent necessary to recover from the partial suspend that was just performed. Therefore, if a Checkpoint is being taken, at 982 the Suspend Routine jumps to task 484 of the Resume Routine, which then performs a partial resume.

If a Checkpoint is not being taken then the Suspend Routine checks whether it was entered due to an active PDI signal, at 981. If the suspend routine was entered due to an active PDI signal, then the suspend routine checks if PDI is still active at 983. If PDI is not active, then the suspend routine jumps to task 982 wherein the suspend is aborted and the system resumes to its normal operating state. This would occur for example, if the suspend routine was entered due to a power disturbance (PDI suspend) and then before task 981 was reached, AC power was restored resulting in the PDI signal being deactivated. Accordingly, in such circumstances, the suspend is aborted and the system returns to its normal operating state.

Referring back to task 983, if PDI is still active, the DEFAULT_ON bit is set at 985 such that when power does return, the system 10 will bootup and change from the suspend state to the normal operating state (resume).

If the suspend was not due to an AC power disturbance and a Checkpoint is not being taken (see tasks 980 and 981), or if the suspend was a PDI suspend and the DEFAULT_ON bit was set at 985 then the CPU 40 will turn "off" the power supply by commanding the microcontroller U2 to pull the ON# signal to a logical ZERO, thereby causing the primary/regulation unit 172 of the power supply 17 to stop providing regulated voltages along the ±5 and ±12 lines, at 340. The voltages take several seconds to ramp down to approximately zero, giving the CPU 40 time to execute numerous commands. Therefore, the CPU 40 executes an endless loop (a "spin"), at 342, as it waits for the system power voltages generated by the power supply 17 to decline until the CPU 40 stops functioning. If the Suspend Routine was entered due to an AC power disturbance AUX5 will then be powered off by the power supply 17 (or 34) as described above.

As described above, when an AC power disturbance occurs (brownout or blackout) or when the power supply 17 or the UPS 36 senses that it can no longer provide power to system 10 while the system is in the normal operating state 150 or the standby state 152, the PDI signal will be activated from the power supply 17 (or alternatively, from the UPS 36).

Referring to FIG. 7, in one embodiment of the present invention, the PDI signal will be supplied from power supply 17 (or UPS 36) to pin P3.7 of the microcontroller U2 and when the APM BIOS monitoring this pin detects that PDI is activated the BIOS will issue a suspend request to the operating system. The operating system will acknowledge the request and enter the Suspend Routine of FIG. 10 at 250.

As an alternative embodiment, the microcontroller U2 can be programmed to generate an SMI (SMI_OUT#) to the CPU 40 when PDI on pin P3.7 is activated. Thereafter, the CPU 40 will execute the SMI interrupt handler routine shown in FIG. 11. The SMI routine starts at 500 when the SMI is issued. The CPU 40 then determines whether PDI is active at 502. If PDI is not active then the SMI routine continues normally at 504. If PDI is active, then the YES branch is taken from decision block 502 to task 506 where the suspend routine of FIG. 10 will be executed.

Either of the two embodiments will cause the entire state of the system 10 to be saved to the hard disk without any data loss. After the suspend is performed the microcontroller U2 will cause primary/regulation unit 172 of the power supply 17 to stop providing regulated voltages at the ±5 VDC and ±12 VDC lines by changing ON to LOW. In addition, when ON is Low (ON# goes High) and power is being supplied from backup power in power supply 17, then circuitry within power supply 17 will cause AUX5 to be removed. If UPS 36 is being used, then when ON goes Low (ON# goes High) and the UPS 36 is supplying power, then circuitry within the UPS 36 will cause AC Line-Out2 of the UPS 36 to drop thereby dropping all power to power supply 34. Accordingly, AUX 5 will also be removed. Thus, after a PDI suspend is performed, power supply 17 or 34 will not be supplying power on any of the ±5 V, ±12 V and AUX5 lines. AUX 5 is powered off to insure that system 10 sees the reset of the microcontroller U2 upon return of AC power (regardless of whether AC power returns before or after the stored power in power supply 17 or UPS 36 is exhausted) to resume the system 10 from the suspend state to the normal operating state as described below.

A suspend to disk can take about one half a second per megabyte of memory to be stored, in addition to the time required for BIOS or the OS to respond to the presence of the PDI signal (approximately 5 seconds). As an example, a system with 64 megabytes (MB) of system RAM and 2 MB of video RAM would require that the PDI signal be generated (activated) at least ((64 MB*0.5 sec/MB)+(2 MB*0.5 sec/MB)+5 sec)=38 seconds before power is no longer generated to system 10. In other words, the power supply 17 or UPS 36 must have at least 38 seconds of backup power storage for such a system. Of course, it should be understood by those skilled in the art of the present invention that the system 10 should be designed such that the power supply 17 or the UPS 36 can supply power to system 10 for a sufficient length of time after a power disturbance wherein the length of time is determined by the amount of memory to be stored.

If after an AC power disturbance (brownout or blackout), AC power from the wall outlet returns while the system is in the suspend routine due to the activated PDI signal, the PDI signal will be removed (deactivated) and the system 10 will return to its normal operating state (resume) as described above with regard to FIG. 10 tasks 983 and 982.

If after the system 10 is in the suspend state due to an AC power disturbance, AC power at a predetermined level returns to the wall outlet (i.e., power disturbance no longer exists and AC power is supplied on AC Line In of power supply 17 or AC Line In 2 or UPS 36) either before or after the backup stored power within the power supply 17 or UPS 36 is exhausted (note that in either case ±5 VDC, ±12 VDC lines and AUX 5 are not being powered), the power supply 17 will then power up AUX 5 and the microcontroller U2 will be reset. After the microcontroller U2 is reset, it will set ON high (ON# low) and the power supply 17 or 34 will provide ±5 VDC and ±12 VDC on its output(i.e., system power will be turned on). The system will then enter the boot up routine of FIG. 9. As noted above, since (1) the microcontroller U2 was reset, (2) the DEFAULT_ON bit would have been set during the PDI suspend routine and (3) the Suspend Enable Flag would have been set during the suspend routine, execution would proceed in the bootup routine from task 380 . . . to task 996 to task 998 to task 1004 . . . to task 422 where the system will resume to its normal operating state. Accordingly, upon return of AC power after a PDI suspend, the system would automatically resume from the suspend state to its normal operating state.

The present invention includes several advantages. For example, the power supply 17 or the UPS 36 need only have sufficient backup power to allow the system 10 to perform the suspend routine regardless of how long the AC power disturbance lasts. Since the cost of backup power is proportional to the amount of time a power supply can supply such backup power, the cost of the power supply 17 or 32 (latter of which includes UPS 36) of the present invention is substantially lower than the cost of a power supply or UPS which can supply power for the duration of the AC power disturbance. In addition, computer systems having the latter power supply or UPS suffer from the disadvantage that data will still be lost once the power supply's or UPS's stored charge expires while in the system of the present invention data is never lost since it is saved to the hard disk prior to the expiration of the backup power.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, many of the tasks performed by the power management circuit 106, such as hardware monitoring of one or more interrupts, can be built into the system chipset. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A computer system capable of operating in at least two states of power management, a normal operating state in which code is executed by said computer system and a suspend state, the system comprising:

(a) a CPU capable of executing said code;

(b) power management circuitry in circuit communication with said CPU for selectively changing the state of said computer system between said normal operating state and said suspend state responsive to a control signal;

(c) a power supply in circuit communication with said CPU and said power management circuitry comprising circuitry for selectively providing system power from an external source to said computer system responsive to said power management circuitry, characterized by having a first power supply state, a second power supply state and a third power supply state and further characterized by having circuitry for providing auxiliary power to said power management circuitry, said power supply further comprising circuitry for providing system power to said computer system and auxiliary power to said power management circuitry from an internal source, said power supply being operative to generate said control signal to said power management circuitry when said system is in said normal operating state and said external source stops providing power at a predetermined level to said power supply, wherein said first power supply state is characterized by said power supply providing system power to said computer system from said external source and auxiliary power to said power management circuitry from said external source, wherein said second power supply state is characterized by said power supply not providing system power to said computer system from said external source and said power supply providing auxiliary power to said power management circuitry from said external source, wherein said third power supply state is characterized by said power supply providing system power to said computer system and auxiliary power to said power management circuitry from said internal source, wherein said normal operating state is characterized in that said power supply is in said first power supply state; and wherein said suspend state is characterized by the code executing on the CPU being reversibly interrupted such that the execution of the code on the CPU is capable of being resumed after the power supply changes to said first power supply state, and said power management circuitry being characterized in that while in said normal operating state, responsive to said power supply activating said control signal, said power management circuitry causes said computer system to change to said suspend state.

2. The computer system of claim 1, wherein responsive to said power supply activating said control signal, said power management circuitry initiates a suspend routine which is performed by BIOS code to change the system from the normal operating state to the suspend state.

3. The computer system of claim 1, wherein during said change from said normal operating state to said suspend state said power supply is in the third power supply state and after said change the power management circuitry and circuitry within said power supply causes said power supply to transition to a fourth power supply state wherein said fourth power supply state is characterized by said power supply not providing system power to said computer system from said internal source or said external source and said power supply not providing auxiliary power to said power management circuitry from said internal source or said external source.

4. The computer system of claim 3, wherein responsive to return of said external source providing power at said predetermined level to said power supply, said power supply is operative to transition from said fourth power supply state to said second power supply state, said power management circuitry is further characterized by causing said power supply to transition from the second power supply state to the first power supply state responsive to the power supply transitioning from the fourth power supply state to the second power supply state.

5. The computer system of claim 4, wherein after said power supply transitions to the first power supply state, said CPU is operative to execute code which will resume said system from said suspend state to the normal operating state.

6. The computer system of claim 1, wherein said power supply is further characterized by causing said power supply to transition from said first power supply state to said third power supply state responsive to said external source not providing power at said predetermined level.

7. The computer system of claim 1, wherein said power supply includes a main power supply which includes the circuitry for selectively providing system power from an external source to said computer system and providing said auxiliary power to said power management circuitry from said external source and wherein said internal source is an uninterruptable power supply coupled to said main power supply and being operative to generate said control signal.

8. The computer system of claim 1, wherein said power management circuitry comprises a power management processor.

9. The computer system of claim 1, further including:

a peripheral device in circuit communication with said CPU and said power management circuitry and capable of operating in a selected one of a high electrical power usage state and a low electrical power usage state, said peripheral device changing between said high and low electrical power usage state in response to said power management circuitry, said computer system is further capable of operating in a third state of power management, a standby state, said standby state being characterized in that said power supply is in said first power supply state and said peripheral device is in said low electrical power usage state, said power supply is further operative to generate said control signal to said power management circuitry when said system is in said standby state and said external source stops providing power at said predetermined level to said power supply, and said power management circuitry being characterized in that while in said standby state, responsive to said power supply activating said control signal, said power management circuitry causes said computer system to change to said suspend state.

10. The computer system of claim 1, wherein said external source is an AC wall outlet and an AC brownout or blackout at said wall outlet causes said external source to stop providing power at said predetermined level to said power supply.

11. The computer system of claim 1, wherein responsive to said power supply activating said control signal, said power management circuitry is operative to interrupt the execution of code on the CPU by generating an SMI to the CPU allowing the CPU to transfer control to a suspend routine.

12. A computer system capable of operating in at least two states of power management, namely a operating state in which code is executed by said computer system and a suspend state in which execution of code by said computer system is interrupted, the system comprising:

(a) a CPU capable of executing said code;

(b) a power management circuitry in circuit communication with said CPU for selectively changing the state of said computer system between said normal operating state and said suspend state in response to a control signal;

(c) a power supply in circuit communication with said CPU and said power management circuitry comprising circuitry for selectively providing system power from an external source to said computer system responsive to said power management circuitry, characterized by having circuitry for providing auxiliary power to said power management circuitry, said power supply further comprising circuitry for providing system power to said computer system and auxiliary power to said power management circuitry from an internal source, said power supply being operative to generate a control signal to said power management circuitry when said system is in said normal operating state and said external source stops providing power at a predetermined level to said power supply, (d) a non-volatile storage device in circuit communication with said CPU, (e) a volatile memory in circuit communication with said CPU and for storing memory data, (f) volatile registers in circuit communication with said CPU and for storing register data, said power management circuitry being characterized in that while in said normal operating state, responsive to said power supply activating said control signal, said power management circuitry causes said computer system to change to said suspend state, wherein said change from said normal operating state to said suspend state comprises transferring the memory data from said volatile memory to said non-volatile storage device and transferring the register data from the volatile registers to said non-volatile storage device.

13. The computer system of claim 12, wherein said power supply is further characterized by having a first power supply state, a second power supply state and a third power supply state, wherein said first power supply state is characterized by said power supply providing system power to said computer system from said external source and auxiliary power to said power management circuitry from said external source, wherein said second power supply state is characterized by said power supply not providing system power to said computer system from said external source and said power supply providing auxiliary power to said power management circuitry from said external source, wherein said third power supply state is characterized by said power supply providing system power to said computer system and auxiliary power to said power management circuitry from said internal source.

14. The computer system of claim 13, wherein said normal operating state is characterized in that said power supply is in said first power supply state; and wherein said suspend state is characterized by the code executing on the CPU being reversibly interrupted such that the execution of the code on the CPU is capable of being resumed after the power supply changes to said first power supply state.

15. The computer system of claim 13, wherein said normal operating state is characterized in that said power supply is in said first power supply state; and wherein said suspend state is characterized by the register data and the memory data being stored on the non-volatile storage device.

16. The computer system of claim 13, wherein during said change from said normal operating state to said suspend state said power supply is in the third power supply state and after said change the power management circuitry and circuitry within said power supply causes said power supply to transition to a fourth power supply state wherein said fourth power supply state is characterized by said power supply not providing system power to said computer system from said internal source or said external source and said power supply not providing auxiliary power to said power management circuitry from said internal source or said external source.

17. The computer system of claim 16, wherein responsive to return of said external source providing power at said predetermined level to said power supply, said power supply is operative to transition from said fourth power supply state to said second power supply state, said power management circuitry is further characterized by causing said power supply to transition from the second power supply state to the first power supply state responsive to the power supply transitioning from the fourth power supply state to the second power supply state.

18. The computer system of claim 17, wherein after said power supply transitions to the first power supply state, said CPU is operative to execute code which will resume said system from said suspend state to the normal operating state.

19. The computer system of claim 12, further including:

a peripheral device in circuit communication with said CPU and said power management circuitry and capable of operating in a selected one of a high electrical power usage state and a low electrical power usage state, said peripheral device changing between said high and low electrical power usage state in response to said power management circuitry, said computer system is further capable of operating in a third state of power management, a standby state, said standby state being characterized in that said power supply is in said first power supply state and said peripheral device is in said low electrical power usage state, said power supply is further operative to generate said control signal to said power management circuitry when said system is in said standby state and said external source stops providing power at said predetermined level to said power supply, and said power management circuitry being characterized in that while in said standby state, responsive to said power supply activating said control signal, said power management circuitry causes said computer system to change to said suspend state.

20. The computer system of claim 12, wherein said power supply is further characterized by causing said power supply to transition from said first power supply state to said third power supply state responsive to said external source not providing power at said predetermined level.

21. The computer system of claim 12, wherein said power supply includes a main power supply which includes the circuitry for selectively providing system power from an external source to said computer system and providing said auxiliary power to said power management circuitry from said external source and wherein said internal source is an uninterruptable power supply coupled to said main power supply and being operative to generate said control signal.

22. The computer system of claim 12, wherein said non-volatile storage device comprises a fixed disk storage device.

23. The computer system of claim 12, wherein said power management circuitry comprises a power management processor.

24. The computer system of claim 12, wherein said external source is an AC wall outlet and an AC brownout or blackout at said wall outlet causes said external source to stop providing power at said predetermined level to said power supply.

25. The computer system of claim 12, wherein responsive to said power supply activating said control signal, said power management circuitry is operative to interrupt the execution of code on the CPU by generating an SMI to the CPU allowing the CPU to transfer control to a suspend routine.

26. The computer system of claim 12, wherein responsive to said power supply activating said control signal, said power management circuitry initiates a suspend routine which is performed by BIOS code to change the system from the normal operating state to the suspend state.

27. A computer system capable of operating in at least two states of power management, a normal operating state and a suspend state, the system comprising:

(a) a CPU capable of executing code;

(b) power management circuitry in circuit communication with said CPU for selectively changing the state of said computer system between said normal operating state and said suspend state responsive to a suspend event;

(c) a power supply in circuit communication with said CPU and said power management circuitry comprising circuitry for selectively providing system power from an external source to said computer system responsive to said power management circuitry, characterized by having a first power supply state, a second power supply state and a third power supply state and further characterized by having circuitry for providing auxiliary power to said power management circuitry, said power supply further comprising circuitry for providing system power to said computer system and auxiliary power to said power management circuitry from an internal source, said power supply being operative to generate a control signal when said system in said normal operating state and said external source stops providing power at a predetermined level to said power supply, wherein said first power supply state is characterized by said power supply providing system power to said computer system from said external source and auxiliary power to said power management circuitry from said external source, wherein said second power supply state is characterized by said power supply not providing system power to said computer system from said external source and said power supply providing auxiliary power to said power management circuitry from said external source, wherein said third power supply state is characterized by said power supply providing system power to said computer system and auxiliary power to said power management circuitry from said internal source, wherein said normal operating state is characterized in that said power supply is in said first power supply state; and wherein said suspend state is characterized by the code executing on the CPU being reversibly interrupted such that the execution of the code on the CPU is capable of being resumed after the power supply changes to said first power supply state, and wherein responsive to said power supply activating said control signal said code executes a suspend routine which causes said computer system to change from said normal operating state to said suspend state.

28. The computer system of claim 27, wherein said code is BIOS code characterized by implementing power management state transitions and monitoring the state of said control signal, said BIOS code being capable of interrupting the execution of other code on the CPU and executing said suspend routine in response to said power supply activating said control signal.

29. The computer system of claim 27, wherein said code is operating system code characterized by controlling power management state transitions, said operating system code capable of interrupting the execution of other code on the CPU and calling said suspend routine in response to said power supply activating said control signal.

30. The computer system of claim 27, wherein during said change from said normal operating state to said suspend state said power supply is in the third power supply state and after said change the power management circuitry and circuitry within said power supply causes said power supply to transition to a fourth power supply state wherein said fourth power supply state is characterized by said power supply not providing system power to said computer system from said internal source or said external source and said power supply not providing auxiliary power to said power management circuitry from said internal source or said external source.

31. The computer system of claim 30, wherein responsive to return of said external source providing power at said predetermined level to said power supply, said power supply is operative to transition from said fourth power supply state to said second power supply state, said power management circuitry is further characterized by causing said power supply to transition from the second power supply state to the first power supply state responsive to the power supply transitioning from the fourth power supply state to the second power supply state.

32. The computer system of claim 31, wherein after said power supply transitions to the first power supply state, said CPU is operative to execute code which will resume said system from said suspend state to the normal operating state.

33. The computer system of claim 27, wherein said power supply is further characterized by causing said power supply to transition from said first power supply state to said third power supply state responsive to said external source not providing power at said predetermined level.

34. The computer system of claim 27, wherein said power supply includes a main power supply which includes the circuitry for selectively providing system power from an external source to said computer system and providing said auxiliary power to said power management circuitry from said external source and wherein said internal source is an uninterruptable power supply coupled to said main power supply and being operative to generate said control signal.

35. The computer system of claim 27, wherein said power management circuitry comprises a power management processor.

36. The computer system of claim 27, further including:

a peripheral device in circuit communication with said CPU and said power management circuitry and capable of operating in a selected one of a high electrical power usage state and a low electrical power usage state, said peripheral device changing between said high and low electrical power usage state in response to said power management circuitry, said computer system is further capable of operating in a third state of power management, a standby state, said standby state being characterized in that said power supply is in said first power supply state and said peripheral device is in said low electrical power usage state, said power supply is further operative to generate said control signal when said system is in said standby state and said external source stops providing power at said predetermined level to said power supply, and said code being characterized in that while in said standby state, responsive to said power supply activating said control signal said code executes said suspend routine which causes said computer system to change to said suspend state.

* * * * *